United States Patent
Sugimoto

(10) Patent No.: US 9,791,947 B2
(45) Date of Patent: Oct. 17, 2017

(54) OPERATION DISPLAY DEVICE, OPERATION DISPLAY METHOD AND TANGIBLE COMPUTER-READABLE RECORDING MEDIUM

(71) Applicant: KONICA MINOLTA, INC., Chiyoda-ku (JP)

(72) Inventor: Yasuaki Sugimoto, Hachioji (JP)

(73) Assignee: KONICA MINOLTA INC., Chiyoda-Ku, Tokyo (JP)

( * ) Notice: Subject to any disclaimer, the term of this patent is extended or adjusted under 35 U.S.C. 154(b) by 34 days.

(21) Appl. No.: 13/934,567

(22) Filed: Jul. 3, 2013

(65) Prior Publication Data

US 2014/0009417 A1    Jan. 9, 2014

(30) Foreign Application Priority Data

Jul. 9, 2012  (JP) .................................. 2012-153711

(51) Int. Cl.
*G06F 3/041* (2006.01)
*G06F 3/0488* (2013.01)
(Continued)

(52) U.S. Cl.
CPC ............ *G06F 3/041* (2013.01); *G06F 1/3231* (2013.01); *G06F 3/0421* (2013.01);
(Continued)

(58) Field of Classification Search
CPC ......... G06F 1/3231; G06F 2203/04803; G06F 2203/04808; G06F 3/041; G06F 3/0488; Y02B 60/1289
(Continued)

(56) References Cited

U.S. PATENT DOCUMENTS 6,549,194 B1   4/2003  McIntyre et al.
2002/0101418 A1*  8/2002  Vernier et al. ................ 345/418
(Continued)

FOREIGN PATENT DOCUMENTS

FR       2867577 A1    9/2005
JP    2002-222169 A    8/2002
(Continued)

OTHER PUBLICATIONS

Notification of Reasons for Refusal issued in corresponding Japanese Patent Application No. 2012-153711, mailed Oct. 22, 2014, and English translation thereof. (13 pages).
(Continued)

*Primary Examiner* — Tony Davis
(74) *Attorney, Agent, or Firm* — Buchanan Ingersoll & Rooney PC

(57) ABSTRACT

Disclosed is an operation display device, including: a display unit; a touch panel to simultaneously detect touch operations carried out with fingers to a display surface of the display unit; a finger shape detecting unit to detect a shape of a contact part of the finger, which contacts to the display surface in each of the touch operations; and a control unit to control display contents of the display unit, wherein when the touch operations are simultaneously detected by the touch panel, the control unit judges whether the touch operations are an operation carried out by one operator or are operations carried out by a plurality of operators in accordance with the shape of the contact part of the finger relating to each touch operation, and changes the display contents of the display unit in accordance with a result of judging the touch operations.

34 Claims, 20 Drawing Sheets

(51) Int. Cl.
G06F 1/32 (2006.01)
G06F 3/042 (2006.01)
G06F 17/24 (2006.01)
G06F 21/31 (2013.01)

(52) U.S. Cl.
CPC .......... *G06F 3/0425* (2013.01); *G06F 3/0488* (2013.01); *G06F 17/243* (2013.01); *G06F 21/31* (2013.01); *G06F 2203/04104* (2013.01); *G06F 2203/04803* (2013.01); *G06F 2203/04808* (2013.01); *Y02B 60/1289* (2013.01)

(58) Field of Classification Search
USPC .................. 345/418, 537, 419, 170–176
See application file for complete search history.

(56) References Cited

U.S. PATENT DOCUMENTS

| | | | |
|---|---|---|---|
| 2005/0183035 | A1 | 8/2005 | Ringel et al. |
| 2007/0220444 | A1* | 9/2007 | Sunday et al. ................ 715/788 |
| 2007/0226636 | A1* | 9/2007 | Carpenter et al. ............ 715/751 |
| 2008/0192059 | A1* | 8/2008 | Kennedy ....................... 345/537 |
| 2009/0084612 | A1* | 4/2009 | Mattice et al. ............ 178/18.04 |
| 2009/0128517 | A1* | 5/2009 | Han .................... H04W 76/023 345/174 |
| 2011/0231795 | A1* | 9/2011 | Cheon et al. ................ 715/810 |
| 2012/0060127 | A1 | 3/2012 | Ilmonen |
| 2012/0151413 | A1* | 6/2012 | Nurmi et al. ................ 715/825 |

FOREIGN PATENT DOCUMENTS

| | | |
|---|---|---|
| JP | 2005-227487 | 8/2005 |
| JP | 2009-282634 A | 12/2009 |
| JP | 2010-020616 | 1/2010 |
| JP | 2010-226248 A | 10/2010 |
| JP | 2011-154546 A | 8/2011 |
| JP | 2012-234230 | 11/2012 |

OTHER PUBLICATIONS

Chi Tai Dang et al., "Hand Distinction for Multi-Touch Tabletop Interaction", ITS 2009 Proceeding of the ACM International Conference on Interactive Tabletops and Surfaces; Nov. 23, 2009; pp. 101-108.
Shouichi Furuichi, "The touch panel which has a user recognition function"; Image Lab, Japan Industrial Publishing Co., Ltd, Dec. 10, 2009, vol. 20, No. 12, pp. 64-69.
Communication dated Jan. 30, 2017 issued by the European Patent Office in corresponding European Patent Application No. 1317581. 5-1972. (9 pages).
Vu T. et al.,"Demo: User Identification and Authentication with Capacitive Touch Communication" MobiSys '12, Jun. 25-29, 2012, p. 483.
Vu T., "One Ring to Rule Them All" A Token-based Identication and Authentication Solution for Mobile Touchscreen-enabled Devices, Apr. 23, 2012, p. 1-1.
McFerran D.,"Samsung Galaxy Tab 10.1 review—CNET" Retrived from the Internet: https://www.cnet.com/uk/products/samsung-galaxy-tab-10-1/review/, Oct. 28, 2011, 11 Pages, XP055376552.
Extended European Search Report dated Jun. 8, 2017, issued by the European Patent Office in corresponding European Application No. EP 13175819.5 (17 pages).

* cited by examiner

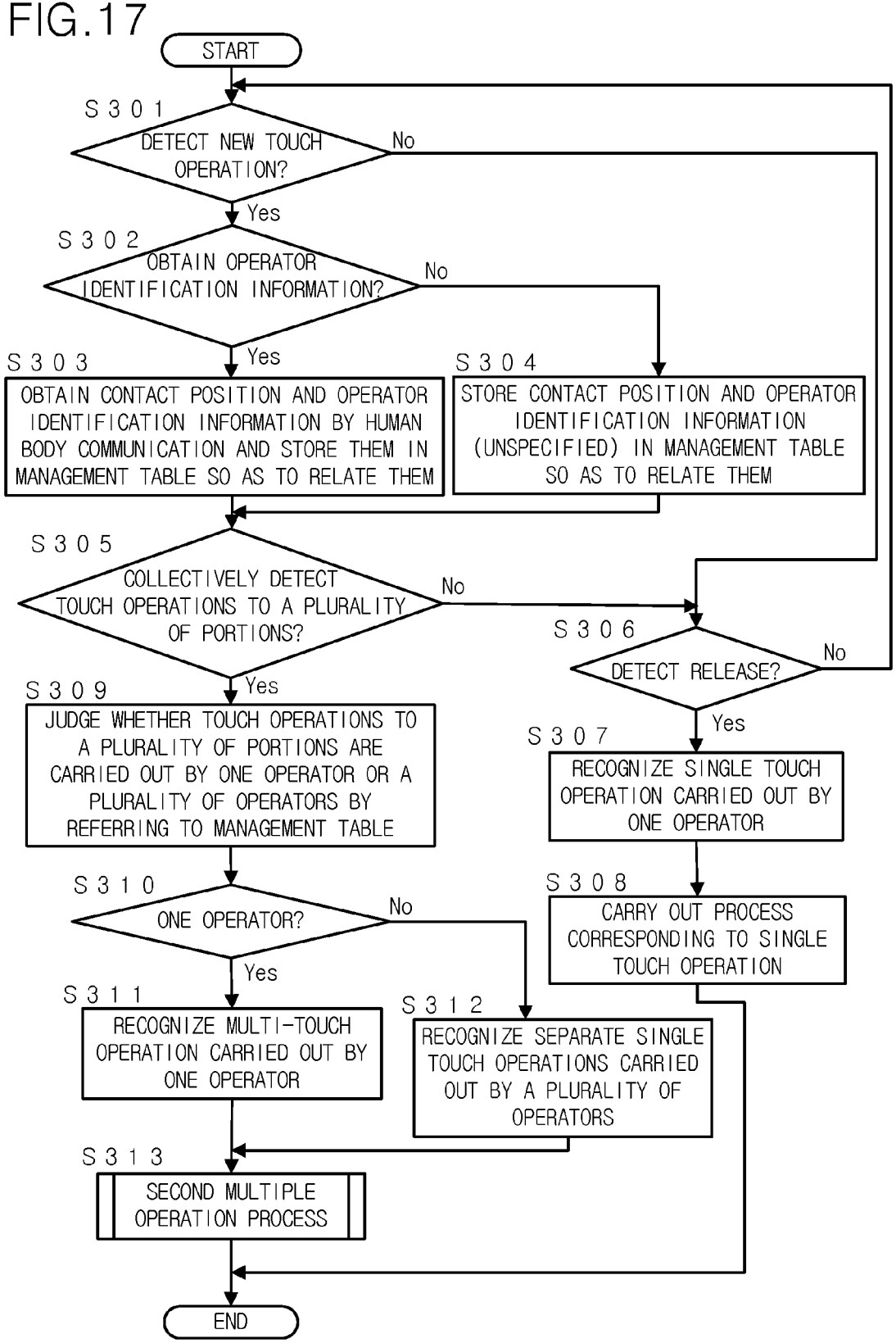

OPERATION DISPLAY DEVICE, OPERATION DISPLAY METHOD AND TANGIBLE COMPUTER-READABLE RECORDING MEDIUM

BACKGROUND OF THE INVENTION

Field of the Invention

The present invention relates to an operation display device comprising a touch panel which can simultaneously detect touch operations to a plurality of portions, an operation display method and a tangible computer-readable recording medium.

Description of Related Art

In an operation display device, such as a terminal device in which a touch panel which can simultaneously detect touch operations which are carried out to a plurality of portions is provided on a display, the touch operations to a plurality of portions by using a plurality of fingers are recognized as a set of operations (multi-touch operation). Therefore, various types of operations, such as pinch in, pinch out, are received.

In a terminal device having a comparatively large display, a large operation display device provided in a conference system, or the like, one operation display device is sometimes used by a plurality of persons. In this case, if the operation display device cannot recognize whether the touch operations to a plurality of portions, which are simultaneously detected are the multi-touch operation carried out by one operator, or separate operations carried out by a plurality of operators (single touch operation), the operation display device cannot receive both of the operations which are simultaneously carried out by a plurality of persons and the multi-touch operation.

As a technology for solving the above problem, for example, the following large-size operation display device has been proposed. In the operation display device, a plurality of users who are near the operation display device are detected and the areas are assigned to the detected users, respectively. Then, the operation is received independently in each area (See Japanese Patent Application Publication No. 2011-154546).

A multi-touch panel for judging whether a plurality of operations which are simultaneously carried out to a plurality of touch input positions on the touch panel, are the multi-touch operation carried out by one operator in accordance with the position relation between a plurality of touch input positions (according to whether a plurality of touch input positions are apart from each other above a certain degree), has been proposed (See Japanese Patent Application Publication No. 2009-282634).

As technologies for specifying the operator, for example, there are technologies for obtaining the authentication information of a user from a terminal device by communicating with the terminal device which is held by an operator who touches the touch panel with the operator's finger, via the body of the operator (See Japanese Patent Application Publications No. 2010-226248 and No. 2002-222169).

In the technologies disclosed in Japanese Patent Application Publications No. 2011-154546 and No. 2009-282634, if a plurality of users are not apart from each other above a certain degree, it is not possible to accurately judge whether the touch operations to a plurality of portions, which are simultaneously detected are the multi-touch operation carried out by one operator or separate single touch operations carried out by a plurality of operators.

SUMMARY

To achieve at least one of the abovementioned objects, an operation display device reflecting one aspect of the present invention, comprises:

a display unit;

a touch panel to simultaneously detect a plurality of touch operations which are carried out with fingers to a display surface of the display unit;

a finger shape detecting unit to detect a shape of a contact part of the finger, which contacts to the display surface in each of the touch operations; and a control unit to control display contents of the display unit, wherein when the plurality of touch operations carried out to the display surface are simultaneously detected by the touch panel, the control unit judges whether the plurality of touch operations are an operation carried out by one operator or are operations carried out by a plurality of operators in accordance with the shape of the contact part of the finger relating to each touch operation, which is detected by the finger shape detecting unit, and changes the display contents of the display unit in accordance with a result of judging the plurality of touch operations.

Preferably, when the control unit judges that the plurality of touch operations are the operation carried out by one operator, the control unit recognizes that the plurality of touch operations are a set of operations, and changes the display contents in accordance with contents of the set of operations, and when the control unit judges that the plurality of touch operations are the operations carried out by the plurality of operators, the control unit divides the display surface into a plurality of areas corresponding to the number of the operators, and instructs the display unit to display separate windows in the areas respectively, and the touch panel receives the operation independently in each of the separate windows.

Preferably, when the control unit judges that the plurality of touch operations are the operations carried out by the plurality of operators, the control unit judges a direction of the operator corresponding to each finger in accordance with the shape of the contact part of each finger, which is detected by the finger shape detecting unit, assigns the areas to the plurality of operators respectively, and instructs the display unit to display the separate windows in the areas assigned to the plurality of operators respectively, so as to match each direction of the operators.

Preferably, the control unit changes a division direction in which the display surface is divided into the plurality of areas, in accordance with a dispersion status of contact positions of the fingers relating to the plurality of touch operations in the display surface.

Preferably, the control unit preferentially selects a division pattern in which the display surface is divided into the plurality of areas corresponding to the number of the operators, so as to include the touch operation carried out by each operator in each area, among a plurality of division patterns which are previously set, and divides the display surface in accordance with the selected division pattern.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 17 is a flowchart showing the process which is carried out by the operation display device according to the second embodiment when the operation display device simultaneously detects a plurality of operations;

DETAILED DESCRIPTION OF PREFERRED EMBODIMENTS

Hereinafter, preferred embodiments of the present invention will be explained with reference to the accompanying drawings.

Figure 1:
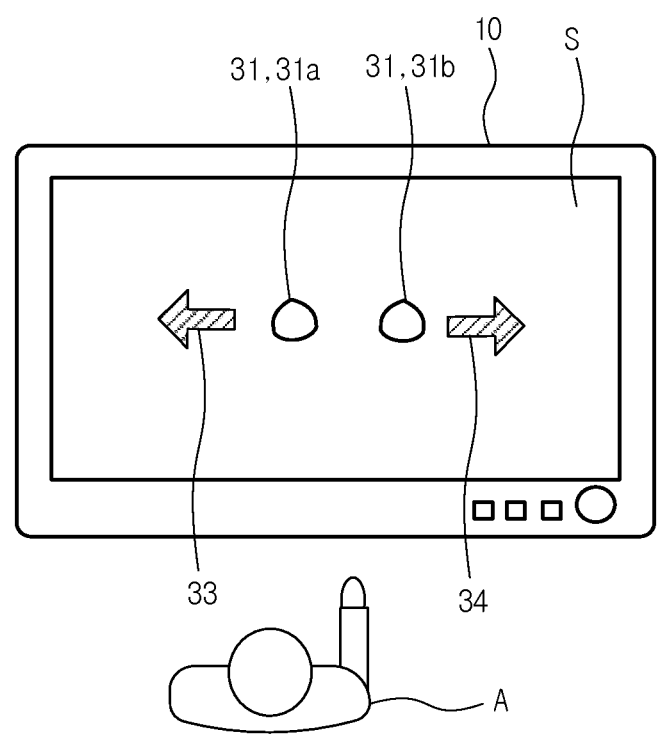
FIG. 1 is an explanatory view showing the situation in which one operator operates the operation display device according to the embodiment.
Figure 2:
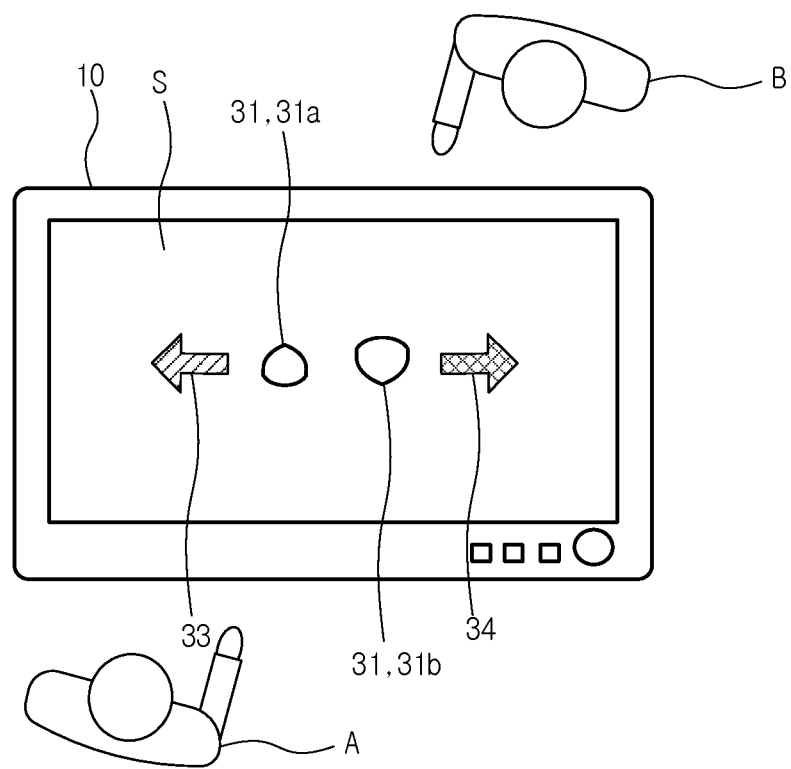
FIG. 2 is an explanatory view showing the situation in which two operators simultaneously operate the operation display device according to the embodiment.

FIG. 1 shows the situation in which one operator A operates the operation display device 10 according to the first embodiment and FIG. 2 shows the situation in which two operators A and B simultaneously operate the operation display device 10.

The operation display device 10 is a portable terminal having a flat shape of approximate B5 size (182 mm×257 mm). In each drawing, each operator is shown sufficiently small as compared with the operation display device 10.

The whole area of the surface of the operation display device 10 is almost the display surface S of the display unit for displaying various types of operation windows. On the whole area of the display surface S, a touch panel unit 17 (See FIG. 3) for detecting various types of operations (touch operations) carried out by the contact with the operator's fingers, is provided.

The touch panel unit 17 has the function of simultaneously detecting a plurality of touch operations. In detail, the touch panel unit 17 is constructed so as to simultaneously detect a plurality of contact positions 31 on which the fingers contact to the display surface S. Further, the operation display device 10 comprises a finger shape detecting unit 24 (See FIG. 3) for detecting the shape of the contact part of the finger, which contacts to the display surface S (hereinafter, also simply referred to as "finger shape").

In FIG. 1, the shape of the contact part of the finger, which contacts to the display surface S is drawn on each contact position 31. In case that the operation display device 10 detects that a plurality of contact positions 31 simultaneously exist on the display surface S, the operation display device 10 judges whether a plurality of touch operations relating to a plurality of contact positions 31 respectively are the operation carried out by one operator or the operations carried out by a plurality of operators in accordance with the finger shapes corresponding to the contact positions 31. Then, according to the above judgment result, the operation display device 10 changes the display contents.

For example, as shown in FIG. 1, when it is detected that two contact positions 31a and 31b simultaneously exist on the display surface S, the operation display device 10 judges whether the operators who carry out the touch operations relating to the two contact positions 31a and 31b respectively are the same person or not in accordance with the finger shapes of the contact parts which contact to the contact positions 31a and 31b. In case that the operation display device 10 judges that the same operator carries out the touch operations, the operation display device 10 recognizes that two touch operations relating to the two contact positions 31a and 31b respectively are the multi-touch operation carried out by one operator. In FIG. 1, the operation display device 10 recognizes that the multi-touch operation in which two contact positions 31a and 31b gradually move apart from each other after the fingers contact to the display surface S as shown by arrows 33 and 34, that is, the pinch out operation carried out by one operator, is received.

On the other hand, as shown in FIG. 2, in case that the operation display device 10 judges that the operators who carry out the two touch operations relating to the two contact positions 31a and 31b respectively are not the same operator, the operation display device 10 recognizes that the two touch operations relating to the two contact positions 31a and 31b are separate single touch operations carried out by two operators. In FIG. 2, the operation display device 10 recognizes that the touch operation relating to the contact position 31a is a flick operation in the left direction and that the touch operation relating to the contact position 31b is a flick operation in the right direction by another operator B.

In the touch operations which are simultaneously detected, it is not necessary that the contacts of the fingers are simultaneously started. The touch operations which are simultaneously detected, include the case in which after the operator A touches the display surface S, the operator B touches the display surface S while the operator A continues to contact to the display surface S with his/her finger. That is, even though the timings of starting a plurality of contacts are different from each other, the operation display device 10 may simultaneously detect the touch operations while both of the contacts are carried out.

Figure 3:
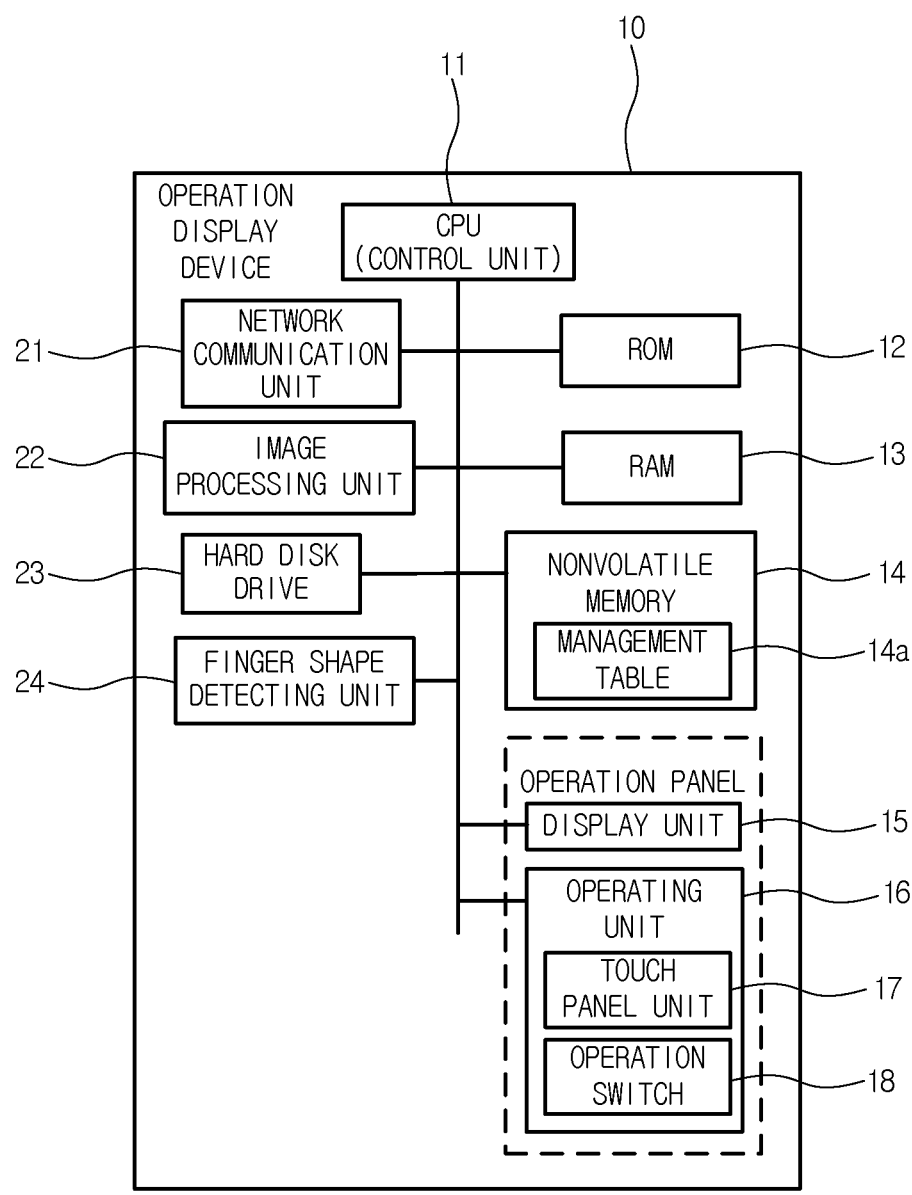
FIG. 3 is a block diagram showing the electric schematic configuration of the operation display device according to the embodiment.

FIG. 3 shows the electric schematic configuration of the operation display device 10. In the operation display device 10, the CPU 11 which functions as the control unit for controlling the entire operation of the operation display device 10, is connected with a ROM (Read Only Memory) 12, a RAM (Random Access Memory) 13, a nonvolatile memory 14, a display unit 15, an operating unit 16, a network communication unit 21, an image processing unit 22, a hard disk drive 23, the finger shape detecting unit 24 and the like via a bus.

In the ROM 12, various types of programs and data are stored. By carrying out various types of processes by the CPU 11 in accordance with these programs, each function of the operation display device 10 is realized. The RAM 13 is used as a work memory for temporarily storing various data when the CPU 11 executes the programs, and a memory for temporarily storing display data.

The nonvolatile memory 14 is a memory in which the stored contents are held even if the operation display device 10 is turned off. In the nonvolatile memory 14, various types of setting contents, user information, communication information (network address and the like) and the like are stored. Further, a management table 14a in which with respect to each detected contact position 31, the position information of the contact position, the information relating to the finger shape, the identification information of the operator who carries out the operation relating to the contact position, and the like are stored so as to relate them to each other, is stored.

The hard disk drive 23 is a nonvolatile memory having the large capacity. The management tale 14a may be stored in the hard disk drive 23, or in the RAM 13.

The display unit 15 comprises a liquid crystal display or the like, and displays various types of operation windows. The display unit 15 displays the window corresponding to the display data stored in a predetermined area of the RAM 13. The CPU 11 prepares and processes the display data. The operating unit 16 comprises the touch panel unit 17 and some operation switches 18. The touch panel unit 17 simultaneously detects a plurality of touch operations. That is, the touch panel unit 17 can simultaneously detect a plurality of contact positions on which the fingers contact to the display surface S. The detecting method of the touch panel unit 17 may be optionally selected, such as electrostatic capacitance, analog/digital resistive films, infrared rays, ultrasonic waves, electromagnetic induction or the like.

The finger shape detecting unit 24 detects the shape of the contact part of the finger, which contact to the display surface S of the display unit 15. In this embodiment, the finger shape detecting unit 24 can simultaneously detect the shapes of the contact parts of a plurality of fingers which contact to the display surface S. The method for detecting the finger shapes may be optionally selected, such as the method for optically reading the shapes of the contact parts, or the like.

The network communication unit 21 has the function of communicating with various types of external devices by connecting with a network via wireless communication. For example, in case that a multi function peripheral having a print function, an original copy function, a facsimile transmission function and the like, is remotely controlled from the operation display device 10, the network communication unit 21 is used for the communication between the operation display device 10 and the multi function peripheral to be operated. The operation display device 10 may be connected with an external device via the near field communication, such as Bluetooth® or the like.

The image processing unit 22 has the function of processing the display data to be displayed on the display unit 15. For example, the image processing unit 22 processes the display data to enlarge or reduce the window or to rotate the data.

When the touch panel unit 17 simultaneously detects a plurality of touch operations, the CPU 11 obtains the information indicating the contact positions in each touch operation from the touch panel unit 17. Further, the CPU 11 obtains the information indicating the shapes of the contact parts of the fingers, which contact to the display surface S, from the finger shape detecting unit 24 and analyzes the obtained information. By this analysis, for example, the information relating to the shape of the contact part of the finger (or the characteristics of the shape), the size of the contact area, the direction of the finger and the like, is obtained as the finger attribute and is registered to the management table 14 so as to relate the above information to the contact position. The CPU 11 judges the identity of the operators by comparing the finger attributes corresponding to the contact positions respectively. For example, when the difference in the direction of the finger (direction of the fingertip) among a plurality of touch operations is less than 45 degree, it is judged that the touch operations are ones carried out by the same operator. When the above difference is not less than 45 degree, it is judged that the touch operations are carried out by a plurality of operators. Then, in accordance with the judgment result, the CPU 11 changes the display contents to be displayed on the display unit 15.

Hereinafter, various types of specific examples thereof will be explained.

Figure 4A:
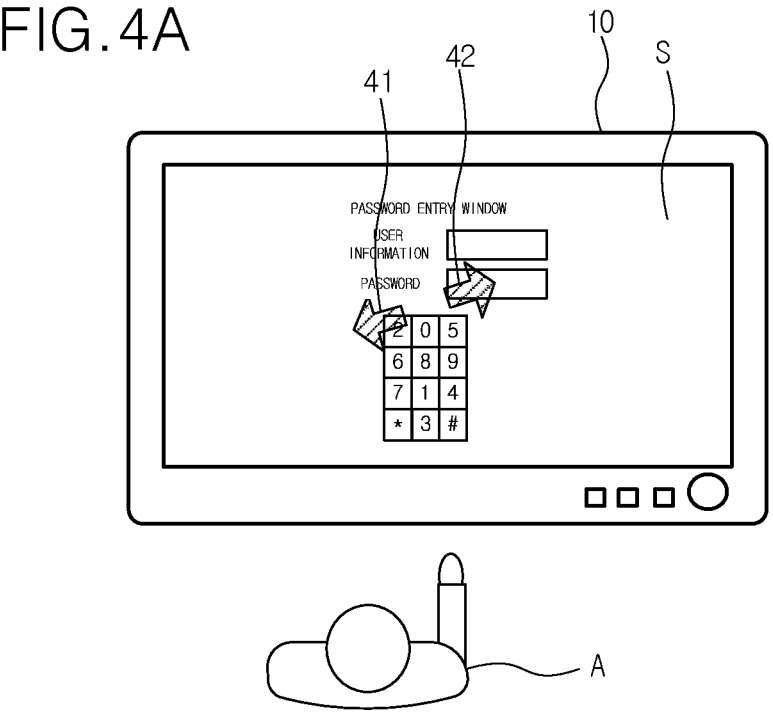
FIGS. 4A and 4B are explanatory views showing the change of the display contents in case that the operation display device receives the pinch out operation from one operator.
Figure 4B:
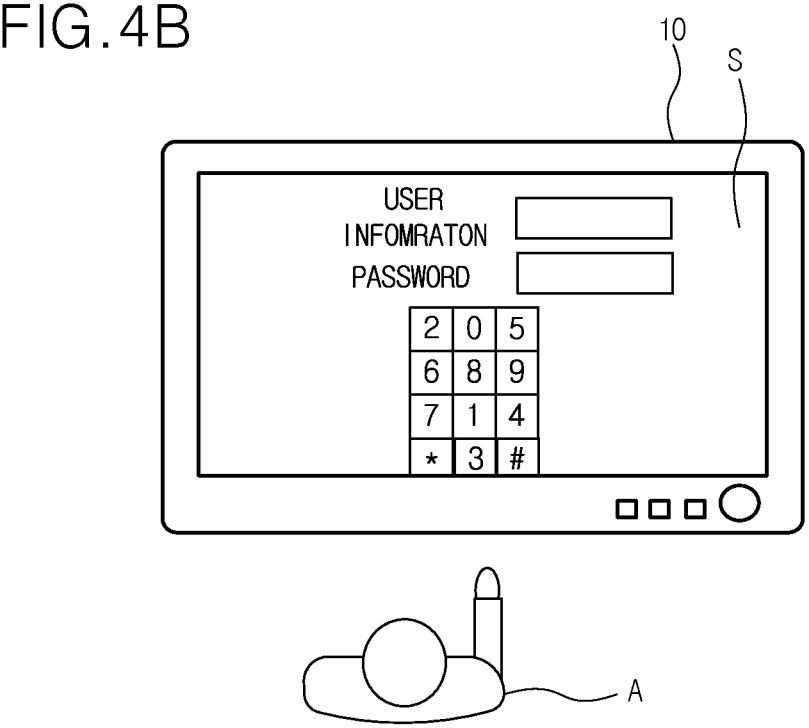

FIGS. 4A and 4B show the case in which the operation display device 10 receives the pinch out operation from one operator. As shown in FIG. 4A, when the touch panel unit 17 simultaneously detects the first touch operation in which after the operator touches the display surface S on the initial point of the left arrow 41, the operator flicks the display surface S in the direction of the left arrow 41, and the second touch operation in which after the operator touches the display surface S on the initial point of the right arrow 42, the operator flicks the display surface S in the direction of the right arrow 42, the CPU 11 judges whether the operator who carries out the first touch operation and the operator who carries out the second touch operation are the same person. That is, the CPU 11 judges whether the operator who carries out the first touch operation and the operator who carries out the second touch operation are the same person by comparing the finger attribute obtained from the shape of the contact part of the finger relating to the first touch operation with the finger attribute obtained from the shape of the contact part of the finger relating to the second touch operation.

In case that the CPU 11 judges that the operators who carry out the touch operations respectively are the same person, the CPU 11 recognizes that the first touch operation and the second touch operation are the multi-touch operation carried out by one operator. In this example, the CPU 11 recognizes that these touch operations are the pinch out operation. As a result, as shown in FIG. 4B, the window is enlarged around the portion in which the pinch out operation is received.

Figure 5A:
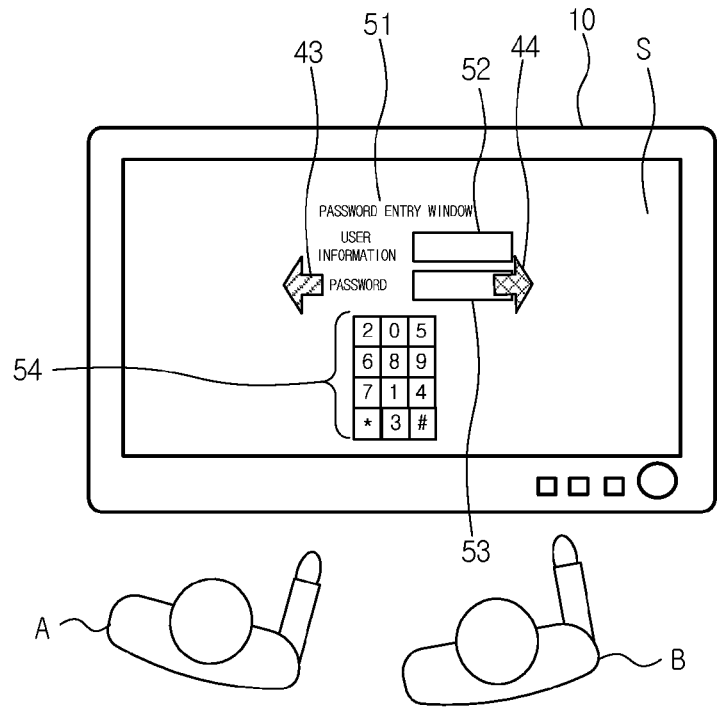
FIGS. 5A and 5B are explanatory views showing an example of the separate windows in case that a plurality of operations which are simultaneously detected are judged as separate single touch operations which are carried out by two operators.
Figure 5B:
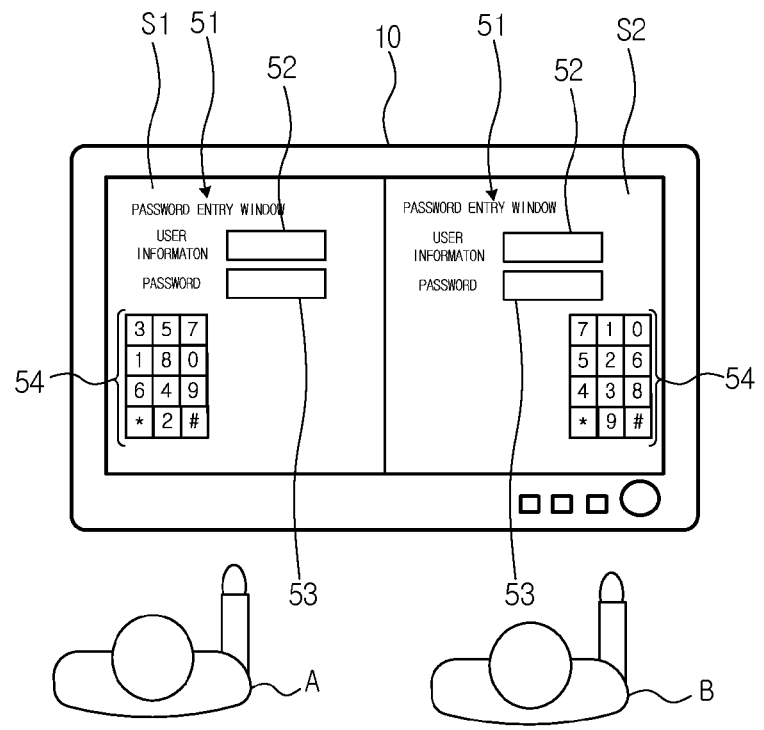

FIGS. 5A and 5B show the case in which a plurality of touch operations which are simultaneously detected are judged as separate single touch operations which are carried out by two operators. As shown in FIG. 5A, when the touch panel unit 17 simultaneously detects the first touch operation in which after the operator touches the display surface S on the initial point of the left arrow 43, the operator flicks the display surface S in the direction of the left arrow 43, and the second touch operation in which after the operator touches the display surface S on the initial point of the right arrow 44, the operator flicks the display surface S in the direction of the right arrow 44, the CPU 11 judges whether the operator who carries out the first touch operation and the operator who carries out the second touch operation are the same person by comparing the finger attribute obtained from the shape of the contact part of the finger relating to the first touch operation with the finger attribute obtained from the shape of the contact part of the finger relating to the second touch operation.

In case that the CPU 11 judges that the operators who carry out the touch operations respectively are different persons, the CPU 11 recognizes that the first touch operation is a single touch operation carried out by the first operator and the second touch operation is a single touch operation carried out by the second operator. In this example, the CPU 11 recognize that the first touch operation is the flick operation in the left direction, which is carried out by the first operator, and the second touch operation is the flick operation in the right direction, which is carried out by the second operator. As a result, as shown in FIG. 5B, the display surface S of the display unit 15 is divided into two areas S1 and S2 and separate windows are displayed in the areas S1 and S2, respectively to receive an operation independently in each of the separate windows. In this example, the display surface S is divided into the left area and the right area, and in each of the areas S1 and S2, the display contents (items) which are the same as the display contents displayed before dividing the display surface, are displayed by changing the layout in the window.

In the example of FIG. 5A, the password entry window for receiving the entry of the password is displayed. In the password entry window, the title 51 of the window, the user information entry box 52, the password entry box 53 and the numerical keypad 54 for receiving the entry of the password (security information), are displayed.

In the password entry window displayed in the left area S1, the numerical keypad 54 is shifted to the left end of the area S1. In the password entry window displayed in the right area S2, the numerical keypad 54 is shifted to the right end of the area S2. Further, the key arrangements of the numerical keypads 54 in the password entry windows displayed in the areas S1 and S2 respectively, are different from each other. Because the numerical keypad 54 has entry buttons for entering the password (security information), it is important to prevent the contents of the operation from being leaked to the adjacent operator.

Therefore, by arranging the numerical keypads 54 so as to be apart from each other in the password entry windows displayed in the area S1 and S2 respectively, it is difficult for the adjacent operator to view the operation to the numerical keypad 54. Further, by dissimilating the key arrangements of the numerical keypads 54 from each other, the contents of the operation cannot be guessed from the motion of the finger.

Figure 6A:
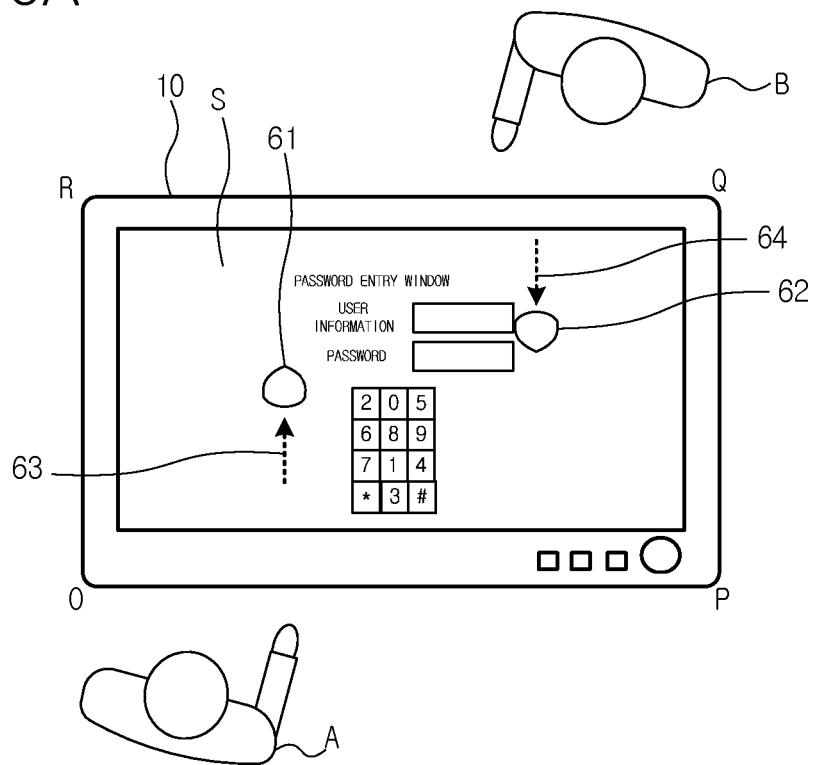
FIGS. 6A and 6B are explanatory views showing another example of the separate windows in case that a plurality of operations which are simultaneously detected are judged as separate single touch operations which are carried out by two operators.
Figure 6B:
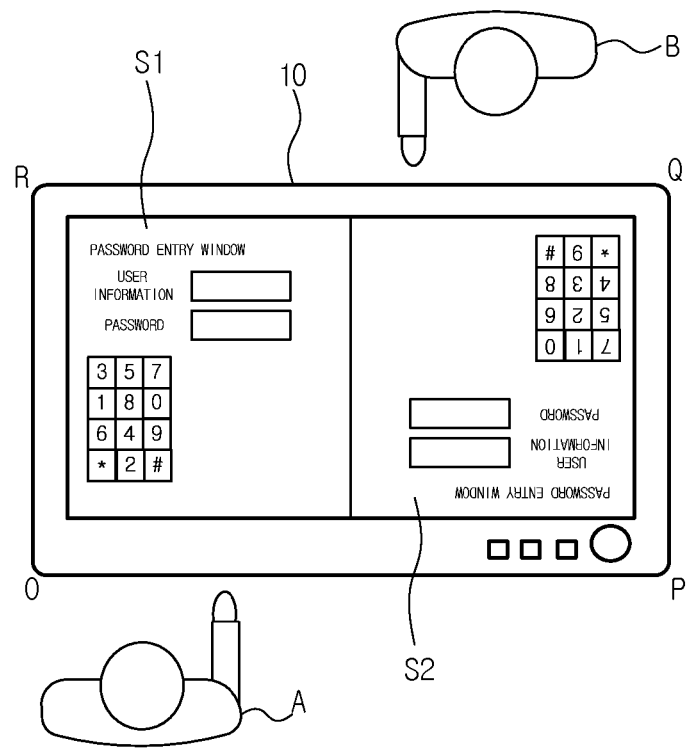

FIGS. 6A and 6B show another example of the separate windows in case that a plurality of touch operations which are simultaneously detected are judged as separate single touch operations which are carried out by two operators. In FIGS. 6A and 6B, the CPU 11 recognizes the direction of the operator corresponding to each finger from each finger shape which is detected by the finger shape detecting unit 24, and instructs the display unit 15 to display the separate windows shown in the areas S1 and S2 assigned to two operators respectively, so as to match each direction of the operators.

In the example of FIGS. 6A and 6B, the CPU 11 judges that the direction of the operator A who carries out the touch operation 61 is the direction of the arrow 63, from the finger shape relating to the touch operation 61, and judges that the direction of the operator B who carries out the touch operation 62 is the direction of the arrow 64, from the finger shape relating to the touch operation 62.

That is, the CPU 11 judges that the operator A who carries out the touch operation 61 stands to the side OP of the rectangular display surface S having the points O, P, Q and R and faces toward the side QR. Further, the CPU 11 judges that the operator B who carries out the touch operation 62 stands to the side QR and faces toward the side OP.

In accordance with the above judgment result, as shown in FIG. 6B, in the area 51, the password entry window is displayed so as to turn the window right side up in case that the window is viewed from the direction of the arrow 63. Further, in the area S2, the password entry window is displayed so as to turn the window right side up in case that the window is viewed from the direction of the arrow 64.

Next, the method for displaying the separate windows in case that the division direction in which the display surface S is divided into a plurality of areas is changed according to the dispersion status of the contact positions of the fingers relating to a plurality of touch operations respectively, will be explained.

As shown in FIGS. 6A and 6B, in case that the contact position of the touch operation 61 is within the left area which is one of the right area and the left area into which the display surface S is divided in halves and that the contact position of the touch operation 62 is within the right area, the display surface S is divided into the left area 51 and the right area S2. On the other hand, as shown in FIGS. 7A and 7B, in case that the contact position of the touch operation 71 is within the upper area which is one of the upper area and the lower area into which the display surface S is divided in halves and that the contact position of the touch operation 72 is within the lower area, the display surface S is divided into the upper area S1 and the lower area S2.

Figure 7A:
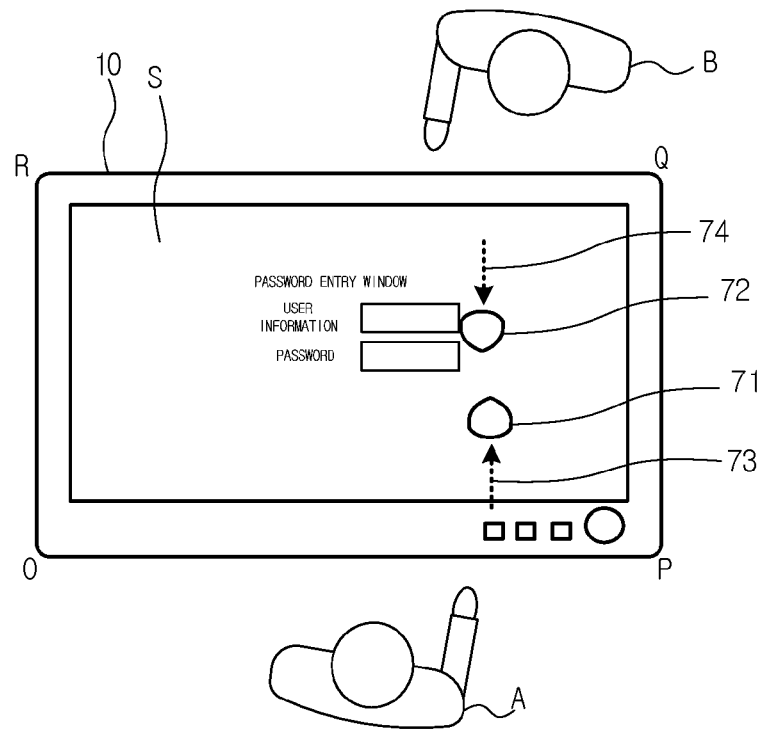
FIGS. 7A and 7B are explanatory views showing an example of the case in which the display surface is divided into the upper area and the lower area.
Figure 7B:
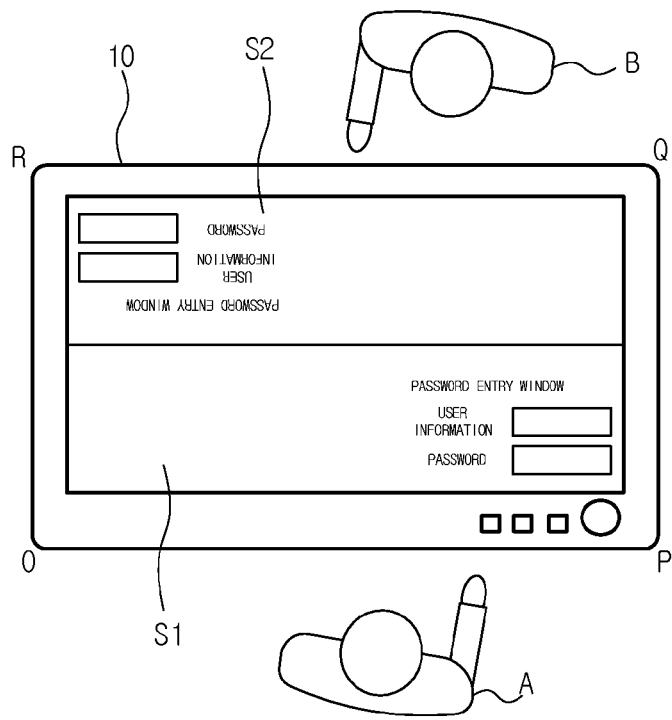

In the example of FIGS. 7A and 7B, the CPU 11 judges that the operator A who carries out the touch operation 71 stands to the side OP of the rectangular display surface S having the points O, P, Q and R and faces toward the side QR, from the finger shape relating to the touch operation 71. Further, the CPU 11 judges that the operator B who carries out the touch operation 72 stands to the side QR of the display surface S and faces toward the side OP, from the finger shape relating to the touch operation 72. Then, in accordance with the above judgment result, as shown in FIG. 7B, in the area S1, the password entry window is displayed so as to turn the window right side up in case that the window is viewed from the direction of the arrow 73. In the area S2, the password entry window is displayed so as to turn the window right side up in case that window is viewed from the direction of the arrow 74.

Each direction of the separate windows displayed in the areas S1 and S2 after dividing the display surface S, is set to match the direction of each operator who carries out the touch operation to the corresponding area. For example, in FIGS. 6A and 6B, the direction of the separate window displayed in the left area S1 is set so as to match the direction of the operator A who carries out the touch operation 61 to the left area S1. The direction of the separate window displayed in the right area S2 is set so as to match the direction of the operator B who carries out the touch operation 62 to the right area S2.

In case that the number of the areas is 2, the division pattern in which the display surface S is equally divided into the right area and the left area, and the division pattern in which the display surface S is equally divided into the upper area and the lower area are previously set. Then, the CPU 11 selects one division pattern in which the contact positions of two touch operations are dispersed on each area one by one.

FIGS. 8A to 8D show the relations between the dispersion status of the contact positions of the fingers relating to the touch operations respectively and the division direction. In order to select the above division pattern, four areas D1 to D4 into which the rectangular display surface S having the points O, P, Q and R is equally divided longitudinally and transversely, are set. The point O is the lower left point, the point P is the lower right point, the point Q is the upper right point, and the point R is the upper left point. The area D1 including the point O is referred to as the lower left area, the area D2 including the point P is referred to as the lower right area, the area D3 including the point R is referred to as the upper left area and the area D4 including the point Q is referred to as the upper right area.

Figure 8A:
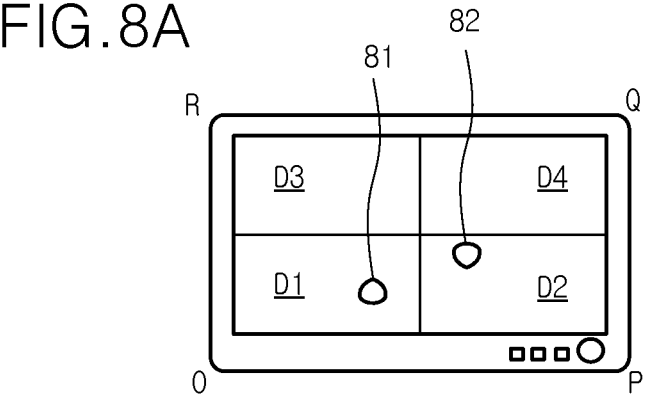
FIGS. 8A to 8D are explanatory views showing the relations between the dispersion status of the contact positions and the division direction.
Figure 8B:
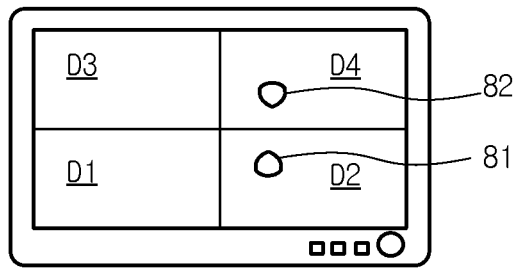

As shown in FIG. 8A, in case that the first touch operation 81 and the second touch operation 82 are dispersed into the lower left area D1 and the lower right area D2, respectively, the division pattern in which the display surface S is divided into the left area and the right area, is selected. That is, in case that the contact positions are dispersed in the right and left direction and are biased toward one of the upper direction and the lower direction, the display surface S is divided into the right area and the left area. As shown in FIG. 8B, in case that the first touch operation 81 and the second touch operation 82 are dispersed into the lower right area D2 and the upper right area D4, respectively, the division pattern in which the display surface S is divided into the upper area and the lower area, is selected. That is, in case that the contact positions are dispersed in the up and down direction and are biased toward one of the right direction and the left direction, the display surface S is divided into the upper area and the lower area.

Figure 8C:
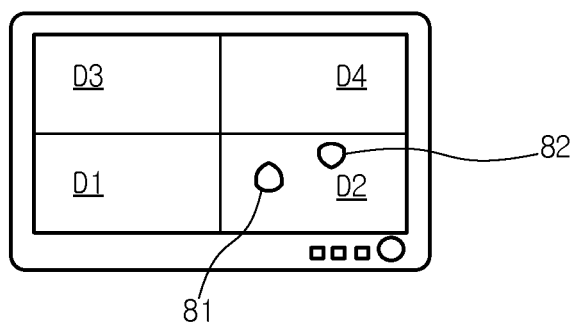

As shown in FIG. 8C, in case that both of the first touch operation 81 and the second touch operation 82 are carried out in the lower right area D2 (one area), that is, in case that the contact positions are biased toward one of the right direction and the left direction and toward one of the upper direction and the lower direction, the division direction is determined by using another condition. For example, the display surface S is divided in a predetermined direction.

Figure 8D:
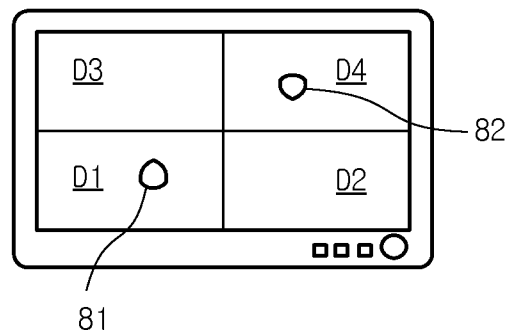

As shown in FIG. 8D, in case that the first touch operation 81 is carried out in the lower left area D1 and the second touch operation 82 is carried out in the upper right area D4, that is, in case that the contact positions are dispersed in the right and left direction and are dispersed in the up and down direction, the division direction is determined by using another condition. For example, the display surface S is divided in a predetermined direction.

In case that the number of the areas is N, the division pattern in which the display surface S is equally divided in the right and left direction, and the division pattern in which the display surface S is equally divided in the up and down direction are previously set. Then, the CPU 11 selects one division pattern in which the contact positions of N touch operations are dispersed on each area one by one.

Figure 9:
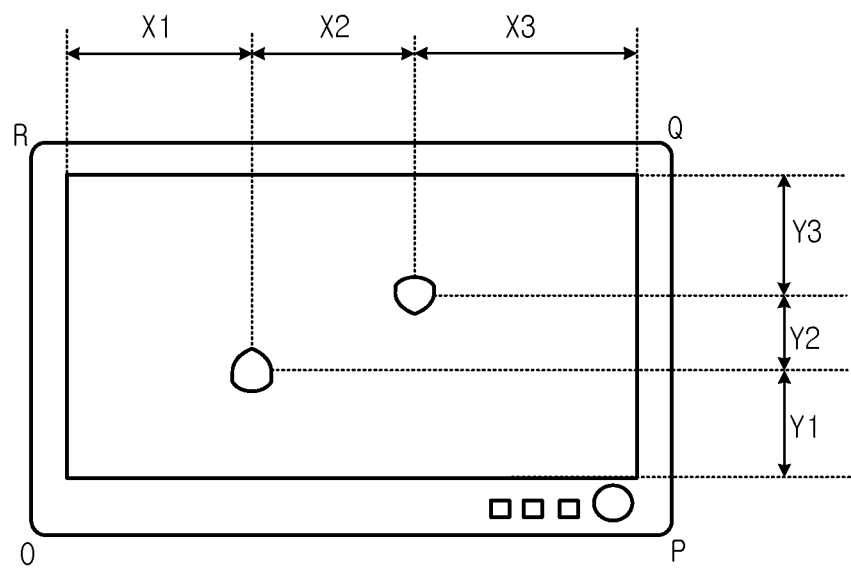
FIG. 9 is an explanatory view showing another standard for determining the division direction.

FIG. 9 shows another standard for determining the division direction. In this example, with respect to the distance between the adjacent touch operations (in case of the touch operation which is carried out closest to one end of the display surface S, the distance between the touch operation and the above one end of the display surface S), the dispersion in the up and down direction and the dispersion in the right and left direction are calculated. Then, the display surface S is divided in the direction in which the dispersion is small.

In the example of FIG. 9, in case of the dispersion in the up and down direction, the dispersion k1 is calculated for the distance Y1 from the side OP and the contact position of the first touch operation, the distance Y2 from the contact position of the first touch operation to the contact position of the second touch operation and the distance Y3 from the contact position of the second touch operation to the side QR.

When the average of Y1, Y2 and Y3 is Ya, k1 is obtained by the following equation:

$$k1=((Y1-Ya)^2+(Y2-Ya)^2+(Y3-Ya)^2)/3.$$

In case of the dispersion in the right and left direction, the dispersion k2 is calculated for the distance X1 from the side OR to the contact position of the first touch operation, the distance X2 from the contact position of the first touch operation to the contact position of the second touch operation and the distance X3 from the contact position of the second touch operation to the side PQ.

When the average of X1, X2 and X3 is Xa, k2 is obtained by the following equation:

$$k2=((X1-Xa)^2+(X2-Xa)^2+(X3-Xa)^2)/3.$$

When k1 is larger than k2, the display surface S is divided into the right area and the left area. When k1 is smaller than k2, the display surface S is divided into the upper area and the lower area. When k1 is equal to k2, the display surface S is divided in a predetermined direction (for example, the transverse direction).

In case that the number of the touch operations is three or more, it is possible to similarly determine the division direction. Further, the division direction may be determined by preferentially using the method shown in FIGS. 8A to 8D. In case that the division direction cannot be determined by using the method shown in FIGS. 8A to 8D (in case of FIGS. 8C and 8D), the division direction may be determined by using the method based on the dispersion shown in FIG. 9.

Further, when the directions of the operators, which are calculated from the finger shapes are the same (in FIG. 6A, when the arrow 63 and the arrow 64 points to one direction), the display surface S is divided in the right area and the left area. Only when the directions of the operators are different from each other, it may be determined whether the display surface S is divided into the right area and the left area or into the upper area and the lower area in accordance with the above set four areas and the dispersion status of the contact positions.

Figure 10A:
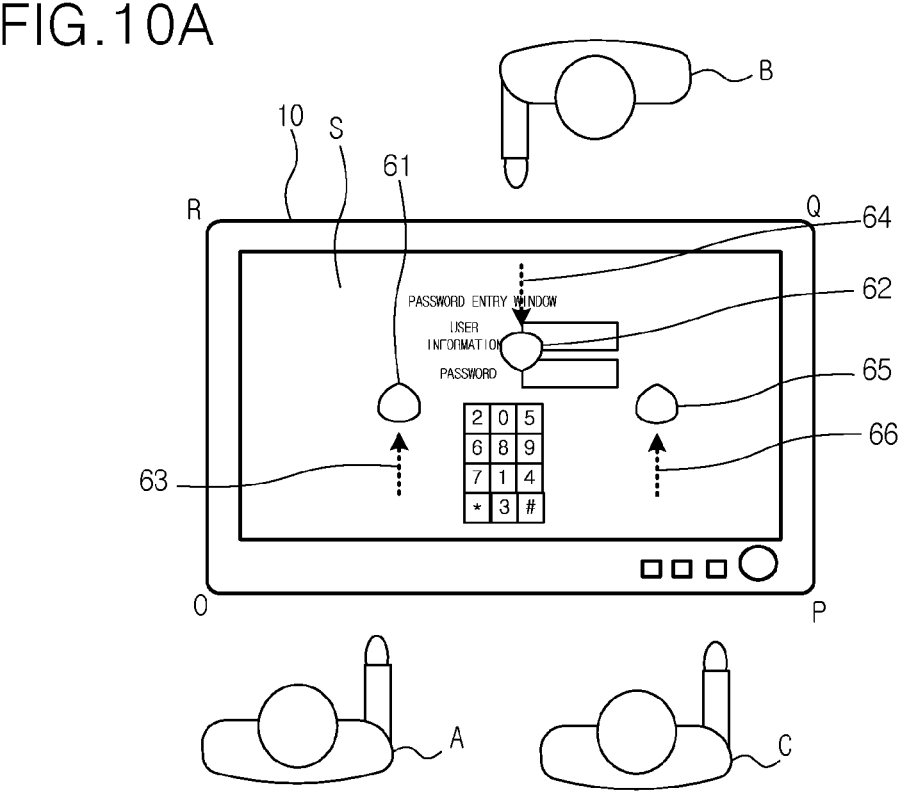
FIGS. 10A and 10B are explanatory views showing an example of the display contents in case that the operation display device simultaneously detects single touch operations which are carried out by three operators and the display surface is divided into three areas.
Figure 10B:
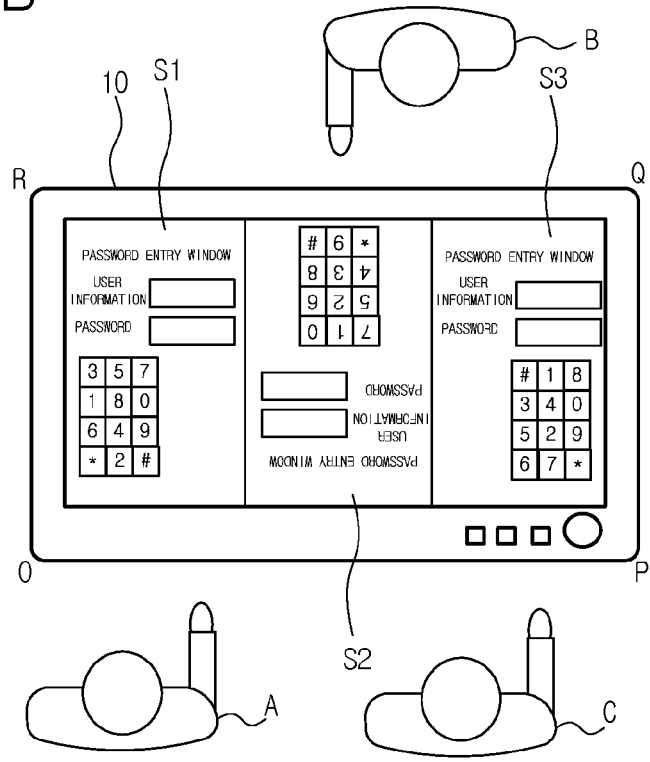

FIGS. 10A and 10B show the case in which the operation display device 10 simultaneously detects single touch operations which are carried out by three operators and the display surface S is divided into three areas S1, S2 and S3. In FIGS. 10A and 10B, the CPU 11 judges that the direction of the operator A who carries out the touch operation 61 is the direction of the arrow 63 from the finger shape relating to the touch operation 61, judges that the direction of the operator B who carries out the touch operation 62 is the direction of the arrow 64 from the finger shape relating to the touch operation 62 and judges that the direction of the operator C who carries out the touch operation 65 is the direction of the arrow 66 from the finger shape relating to the touch operation 65.

That is, the CPU 11 judges that the operator A who carries out the touch operation 61 stands to the side OP of the rectangular display surface S having the points O, P, Q and R and faces toward the side QR. The CPU 11 judges that the operator B who carries out the touch operation 62 stands to the side QR of the display surface S and faces toward the side OP. Further, the CPU 11 judges that the operator C who carries out the touch operation 65 stands to the side OP of the display surface S and faces toward the side QR.

In this example, because the contact positions of three touch operations are dispersed in the right and left direction, the display surface S is equally divided into the right area, the middle area and the left area. Then, the CPU 11 preferentially assigns the touch operations to the areas S1, S2 and S3 in which the contact positions are included respectively, and sets the direction of the separate window displayed in each of the areas S1, S2 and S3 so as to match the direction of each operator who carries out the touch operation assigned to the corresponding area.

As a result, as shown in FIG. 10B, in the area S1, the password entry window is displayed so as to turn the window right side up in case that the window is viewed from the direction of the arrow 63. In the area S2, the password entry window is displayed so as to turn the window right side up in case that the window is viewed from the direction of the arrow 64. Further, in the area S3, the password entry window is displayed so as to turn the window right side up in case that the window is viewed from the direction of the arrow 66.

Figure 11:
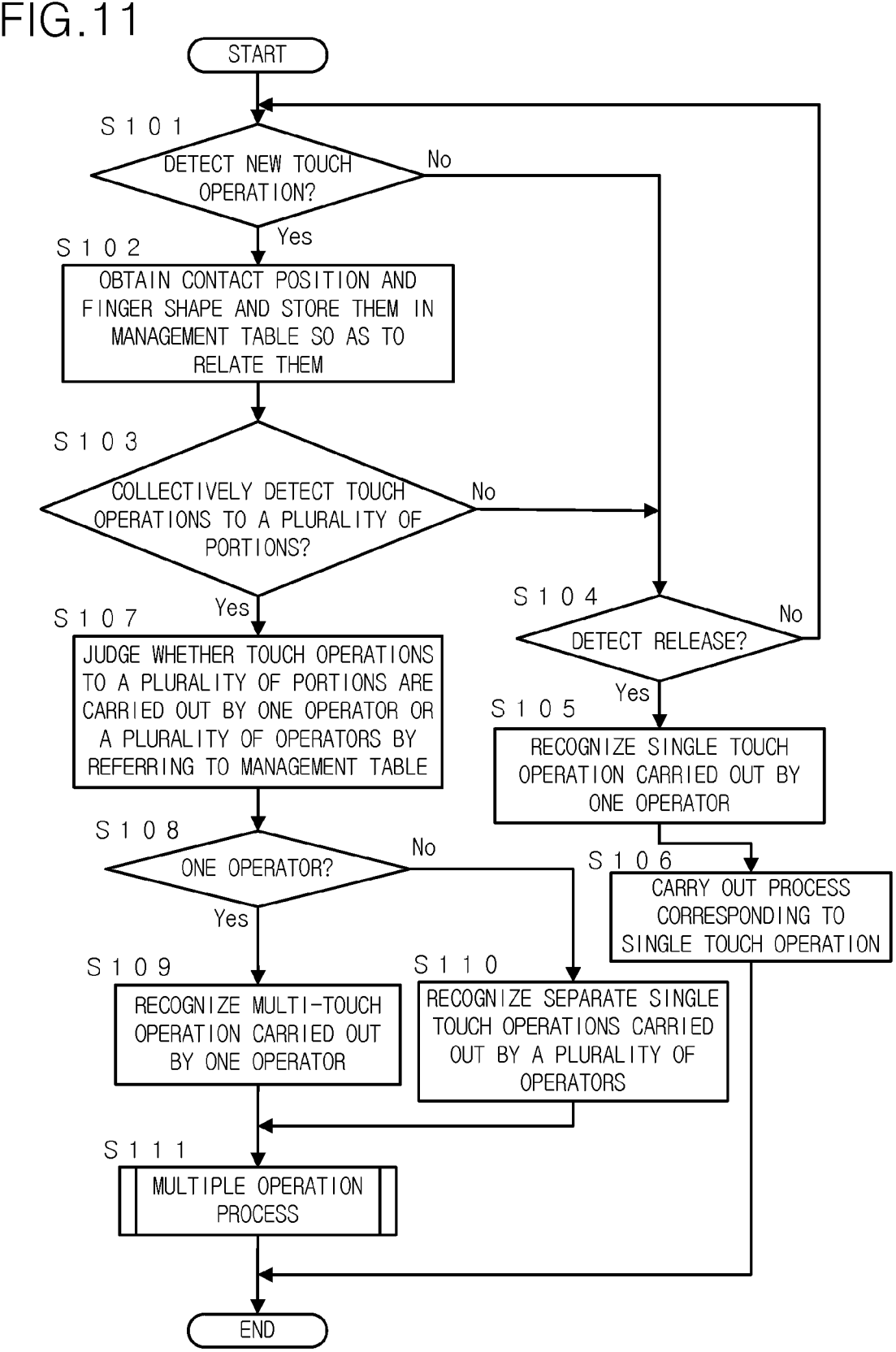
FIG. 11 is a flowchart showing the process which is carried out by the CPU of the operation display device when the operation display device simultaneously detects a plurality of operations.

FIG. 11 shows the process which is carried out by the CPU 11 of the operation display device 10 when the operation display device 10 detects a touch operation. The CPU 11 monitors whether the touch operation (contact) is carried out to the display surface S (Step S101). When the touch panel unit 17 detects a new touch operation (Step S101; Yes), the CPU 11 obtains the contact position of the touch operation from the touch panel unit 17 and obtains the information indicating the shape of the finger with which the touch operation is carried out, from the finger shape detecting unit 24. Then, the above obtained information and the above contact position are registered in the management table 14a so as to relate them to each other (Step S102). In this case, the above finger attribute and the contact position are registered in the management table 14a so as to relate them to each other.

Next, the CPU 11 judges whether the touch operations to a plurality of portions are collectively detected on the display surface S (Step S103). In case that the touch operation is detected only on one portion (Step S103; No), the CPU 11 examines whether the touch operation is released (the finger is released from the display surface S) (Step S104). In case that the touch operation is released (Step S104; Yes), the CPU 11 judges that the touch operation is a single touch operation carried out by one operator (Step S105). The CPU 11 carries out the process corresponding to the single touch operation (process for changing the display contents and outputting the contents of the operation to the multi function peripheral or the like) (Step S106). Then, the process shown in FIG. 11 is ended.

In case that the touch operation is not released (Step S104; No), the CPU 11 examines whether a new touch operation is detected in Step S101. In case that the new touch operation is not received (Step S101; No), the CPU 11 examines whether the touch operation is released or not in Step S104 again.

In case that the touch operations to a plurality of portions are collectively detected (Step S103; Yes), the CPU 11 judges whether the touch operations to a plurality of portions are the multi-touch operation carried out by one operator from the information registered in the management table 14a (Step S107). In this case, the CPU 11 judges whether the touch operations are the multi-touch operation carried out by one person by comparing the information, such as the shape, the size, the direction and the like of the finger corresponding to each touch operation (each contact position registered in the management table 14a). For example, in case that the directions of the fingers relating to a plurality of touch operations respectively are different from each other, it is judged that the touch operations are carried out by a plurality of operators. In case that the directions of the fingers are the same, it is judged whether the difference in the characteristics of the shape of the finger and the size of the finger among a plurality of operations is within a predetermined acceptable range. When the above difference is within the acceptable range, the CPU 11 judges that the touch operations are carried out by one operator. When the above difference exceeds the acceptable range, it is judged that the touch operations are carried out by a plurality of operators.

In case that the CPU 11 judges "one operator" (Step S108; Yes), the CPU 11 recognizes that a plurality of touch operations corresponding to a plurality of contact positions registered in the management table 14a are the multi-touch operation carried out by one operator (Step S109). The CPU 11 carries out the process corresponding to the multi-touch operation (the process for changing the display contents and outputting the contents of the operation to the multi function peripheral or the like) (Step S111). Then, the process shown in FIG. 11 is ended.

In case that the CPU 11 does not judge "one operator" (Step S108; No), the CPU 11 recognizes that a plurality of touch operations corresponding to a plurality of contact positions registered in the management table 14a are separate single touch operations carried out by a plurality of operators (Step S110). The CPU 11 carries out the process corresponding to the single touch operations (for example, the process for displaying the above-described separate windows) (Step S111). Then, the process shown in FIG. 11 is ended.

Figure 12:
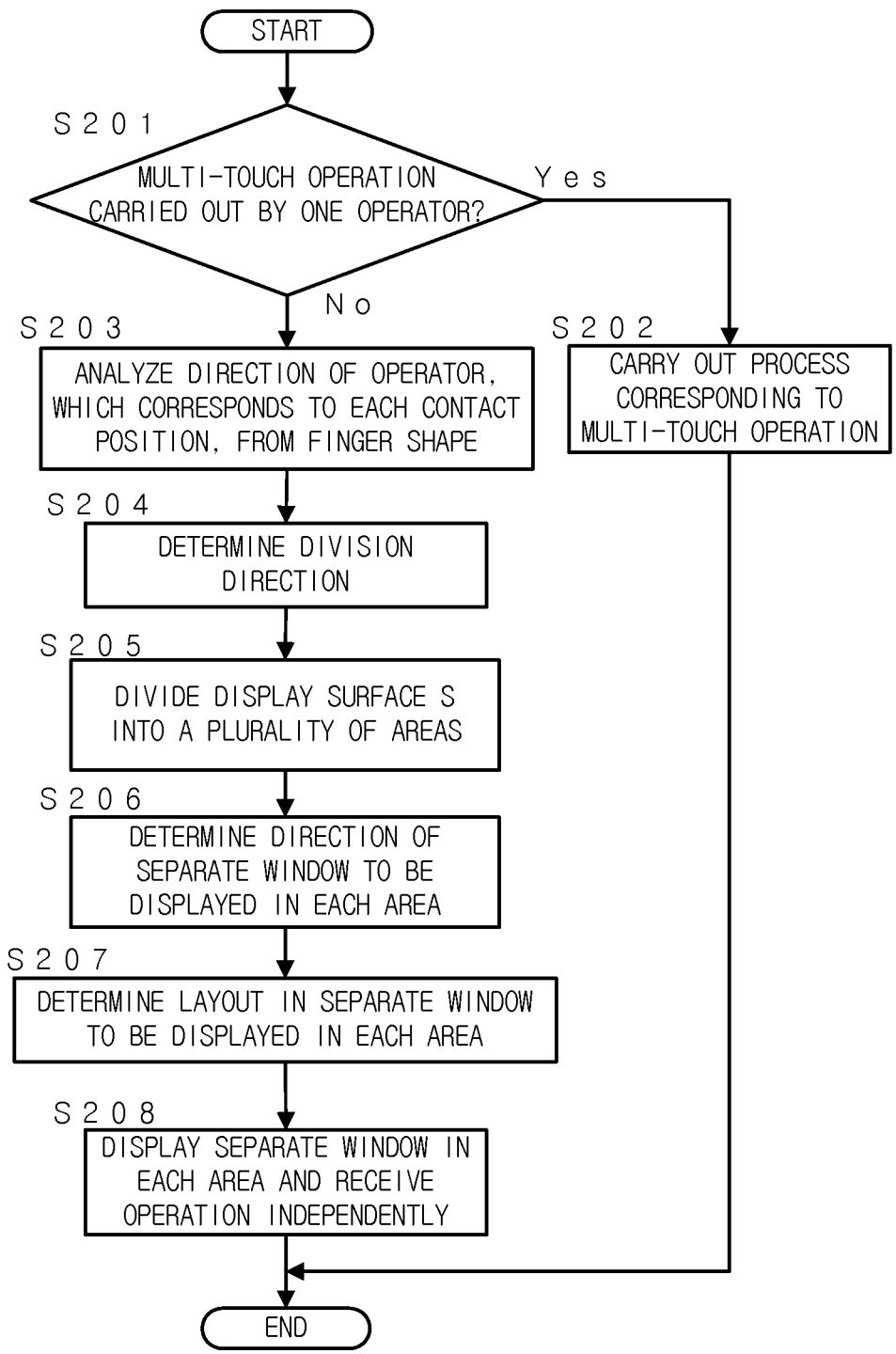
FIG. 12 is a flowchart showing the detail of the multiple operation process (Step S111 in FIG. 11)

FIG. 12 shows the detail of the multiple operation process (Step S111 in FIG. 11). In case that a plurality of touch operations are the multi-touch operation carried out by one operator (Step S201; Yes), the CPU 11 carries out the process corresponding to the multi-touch operation (the process for changing the display contents and outputting the contents of the operation to the multi function peripheral or the like) (Step S202). Then, the process is ended. The multi-touch operation includes the pinch in, the pinch out, the rotation and the like.

In case that a plurality of touch operation are not the multi-touch operation carried out by one operator (Step S201; No), the CPU 11 judges the directions of the faces of the operators who carry out the touch operations respectively, from the finger shapes (mainly, the directions of the fingers) relating to the touch operations respectively (Step S203). Next, the division direction is determined by the above-described method (Step S204). In this case, the display surface S is divided in the up and down direction or in the right and left direction.

Next, the display surface S is divided into the number of areas, which corresponds to the number of the operators, and in the division direction determined in Step S204 (Step S205). Next, the directions of the separate windows displayed in the areas respectively, are determined (Step S206). In detail, the above areas are assigned to a plurality of operators who carry out the touch operations respectively, one by one. In this case, the areas are assigned so as to include the contact position of the operator's finger in the area assigned to the above operator. Then, the direction of the separate window displayed in each area is set so as to match the direction of the operator to which the corresponding area is assigned.

Next, the layout in the separate window displayed in each area is determined (Step S207). As shown in FIGS. 5A and 5B, in order to prevent the information from being leaked by secretly viewing the information by another operator, the position of the operation buttons (numerical keypad 54 and the like) for entering the security information, the position of the password entry box 53 for the security information and the key arrangement of the numerical keypad 54 are determined. Further, the layout in the separate window, the size of each display object, the character size and the like are determined so as to match the size and the shape of the area.

Then, the separate window is displayed in each area in accordance with the determined layout and the like. The operation display device 10 changes to the situation in which the operation can be received independently in each separate window (Step S208), and the process is ended.

As described above, in the operation display device 10 according to the first embodiment, in case that a plurality of touch operations to the display surface S are simultaneously detected, it is possible to judge whether a plurality of touch operations are the multi-touch operation carried out by one operator or the separate single touch operations carried out by a plurality of operators, from the finger shapes relating to the touch operations, respectively.

Next, the second embodiment will be explained.

Figure 13:
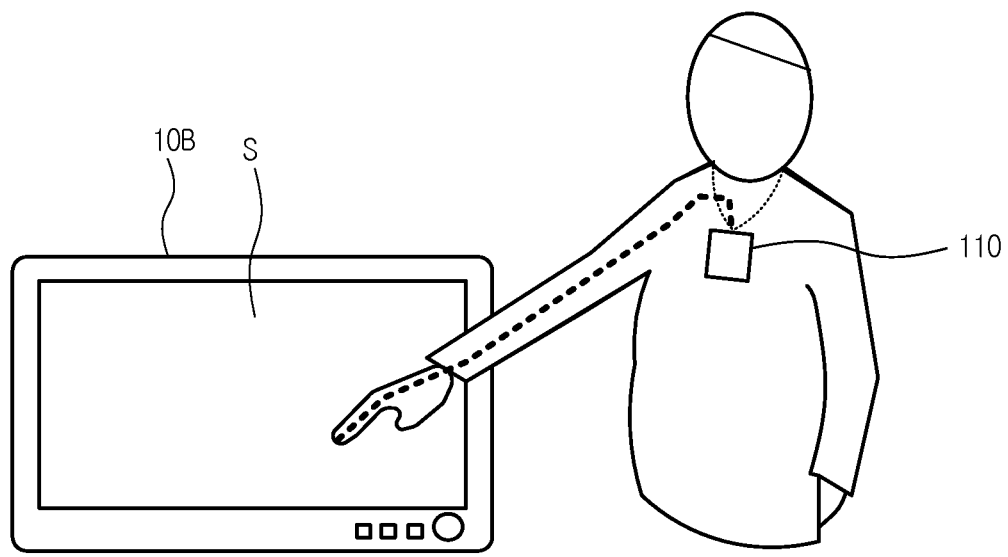
FIG. 13 is an explanatory view showing the situation in which the human body communication is carried out by receiving the touch operation to the display surface with the user's finger.

In the second embodiment, as shown in FIG. 13, when the touch operation carried out to the display surface S by using the finger is received, the operation display device 10B obtains the operator identification information for uniquely specifying the operator from the terminal device 110 by carrying out the communication (human body communication) with the terminal device 110 which is held by the operator via the operator's body including the operator's finger. Then, the operation display device 10B specifies the operator who carries out the touch operation. In case that a plurality of touch operations are simultaneously detected, the operation display device 10B obtains the operator identification information corresponding to each touch operation and judges whether a plurality of touch operations are the multi-touch operation carried out by one operator or not, by comparing the operation identification information.

Figure 14:
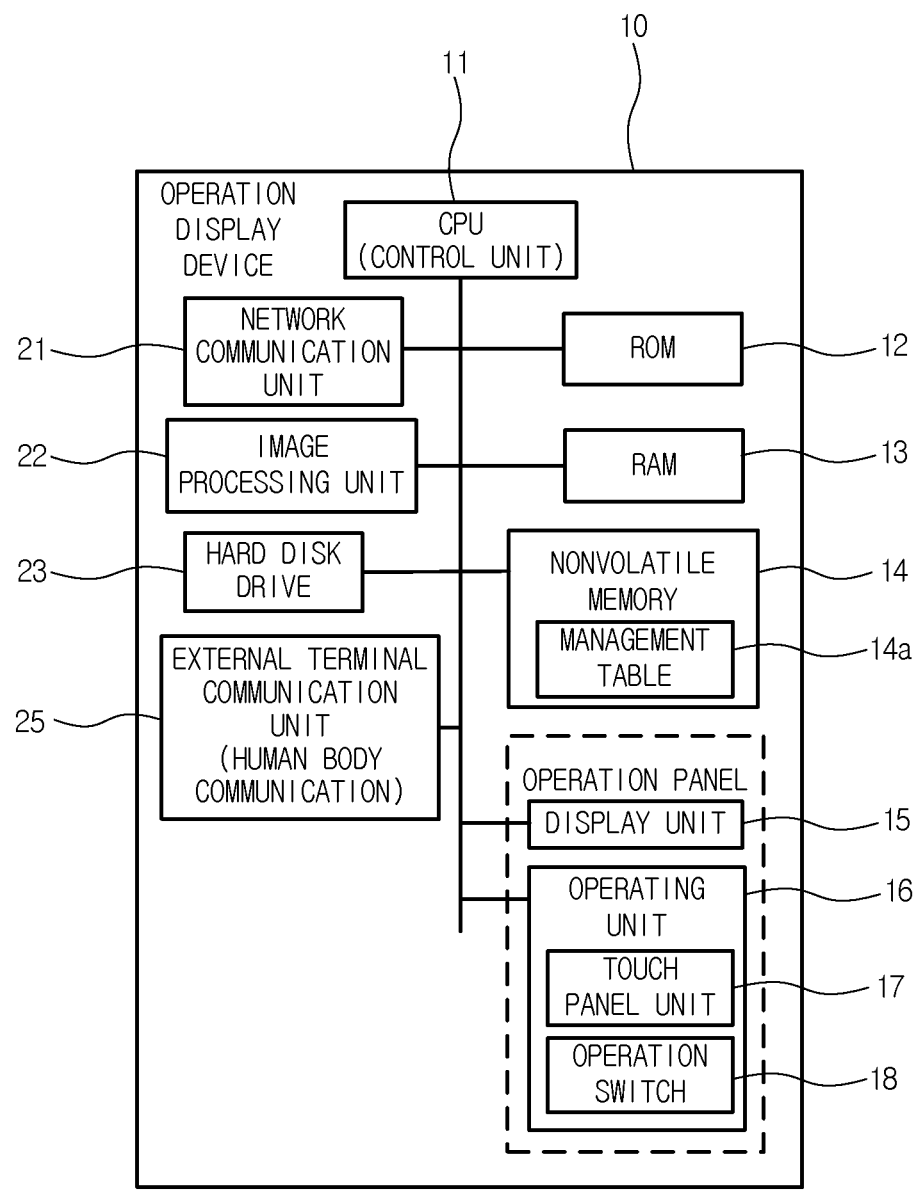
FIG. 14 is a block diagram showing the electric schematic configuration of the operation display device according to the second embodiment.

FIG. 14 shows the electric schematic configuration of the operation display device 10B according to the second embodiment. In the second embodiment, the elements which are the same as those of the operation display device 10 shown in FIG. 3 according to the first embodiment are denoted by the reference numerals which are the same as those shown in FIG. 3, respectively. The explanation of the same elements is arbitrarily omitted. In the operation display device 10B, the CPU 11 which functions as the control unit for controlling the entire operation of the operation display device 10B, is connected with a ROM (Read Only Memory) 12, a RAM (Random Access Memory) 13, a nonvolatile memory 14, a display unit 15, an operating unit 16, a network communication unit 21, an image processing unit 22, a hard disk drive 23, an external terminal communication unit 25 and the like via a bus.

The external terminal communication unit 25 has a function of communicating with the external terminal device 110 by the human body communication. The human body communication in which the body is used as the communication path, includes the current system, the electric field system and the like. In this case, a large number of electrodes are provided on the display surface S and when the operator's finger contacts to any of the electrodes provided on the display surface S, the weak current flows from the electrodes to the operator's finger and body to communicate with the terminal device 110 held by the operator. Even though a plurality of operators simultaneously touch the display surface S, it is possible to carry out the human body communications independently via the electrodes corresponding to the touch positions (contact positions) respectively.

In the management table 14a stored in the nonvolatile memory 14, with respect to each detected contact position of the finger, the position information of the contact position and the operator identification information obtained by the human body communication via the electrodes corresponding to the contact position, are stored so as to relate them to each other.

Each time the touch panel unit 17 detects a new touch operation, the CPU 11 obtains the operator identification information of the operator who carries out the touch operation to the contact position, by the human body communication using the electrodes provided on the contact position of the touch operation. In detail, the CPU 11 transmits the obtaining request for obtaining the operator identification information, to the terminal device 110 and receives the operator identification information from the terminal device 110 as the response to the obtaining request. Then, the CPU 11 registers the information of the contact position and the received operator identification information in the management table 14a so as to relate them to each other. In case that a plurality of touch operations are simultaneously detected, the CPU 11 judges the identity of the operators by comparing the operator identification information corresponding to a plurality of contact positions respectively, which are registered in the management table 14a. Then, in accordance with the judgment result, the CPU 11 changes the display contents of the display unit 15.

Figure 15:
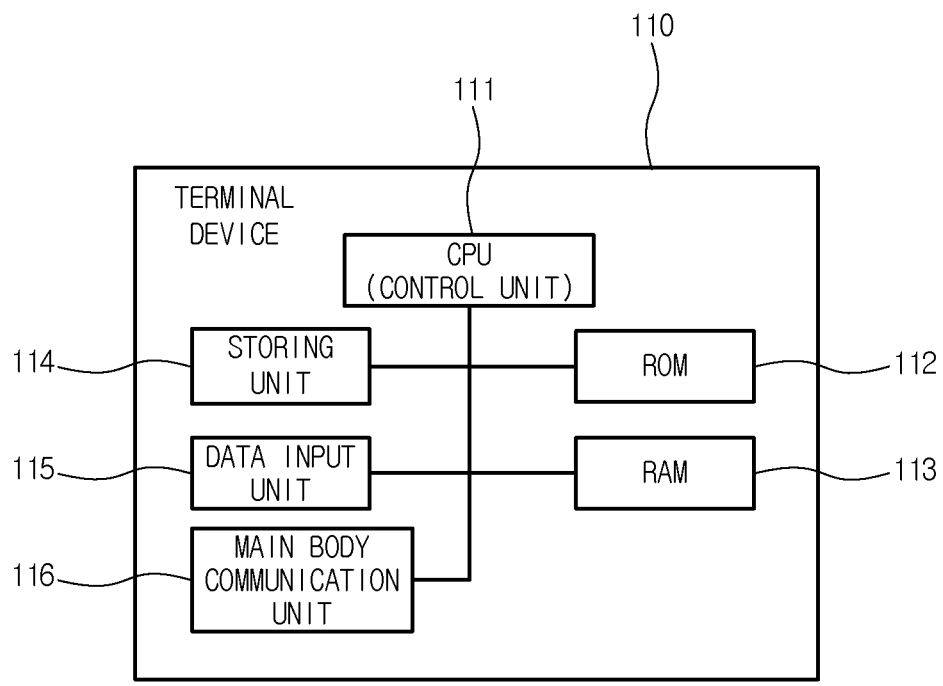
FIG. 15 is a block diagram showing the electric schematic configuration of the terminal device for carrying out the human body communication.

FIG. 15 shows the electric schematic configuration of the terminal device 110. In the terminal device 110, the CPU 111 which functions as the control unit for controlling the entire operation of the terminal device 110, is connected with a ROM 112, a RAM 113, a storing unit 114, a data input unit 115, a main body communication unit 116 and the like via a bus. For example, the terminal device 110 can be made as a card-type of device (for example, the device is embedded in an employee certification), a watch-type of device, a key-type of device or the like.

In the ROM 112, programs and data are stored. By carrying out the process by the CPU 111 in accordance with the programs, each function of the terminal device 110 is realized. The RAM 113 is used as a work memory for temporary storing various data when the CPU 111 executes the programs.

In the storing unit 114, the operator identification information (authorization information) is stored. The storing unit 114 is a nonvolatile memory. The data input unit 115 has a function of an interface unit for inputting the operator identification information to be stored in the storing unit 114, from outside. The main body communication unit 116 has a function of transmitting and receiving various types of information to/from the operation display device 10B by the human body communication.

When the terminal device 110 receives the obtaining request for obtaining the operator identification, from the operation display device 10B by the human body communication, the terminal device 110 reads out the operation identification information from the storing unit 114. Then, the terminal device 110 transmits the operation identification information to the operation display device 10B via the main body communication unit 116 by the human body communication as the response to the obtaining request.

Figure 16A:
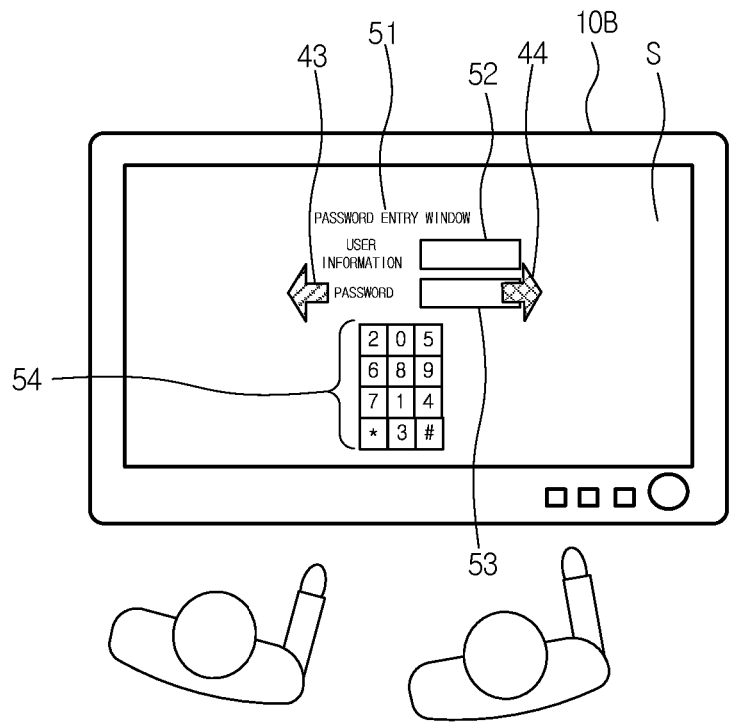
FIGS. 16A and 16B are explanatory views showing an example of the change in the display contents in case that a plurality of operations which are simultaneously detected are judged as separate single touch operations which are carried out by two operators.
Figure 16B:
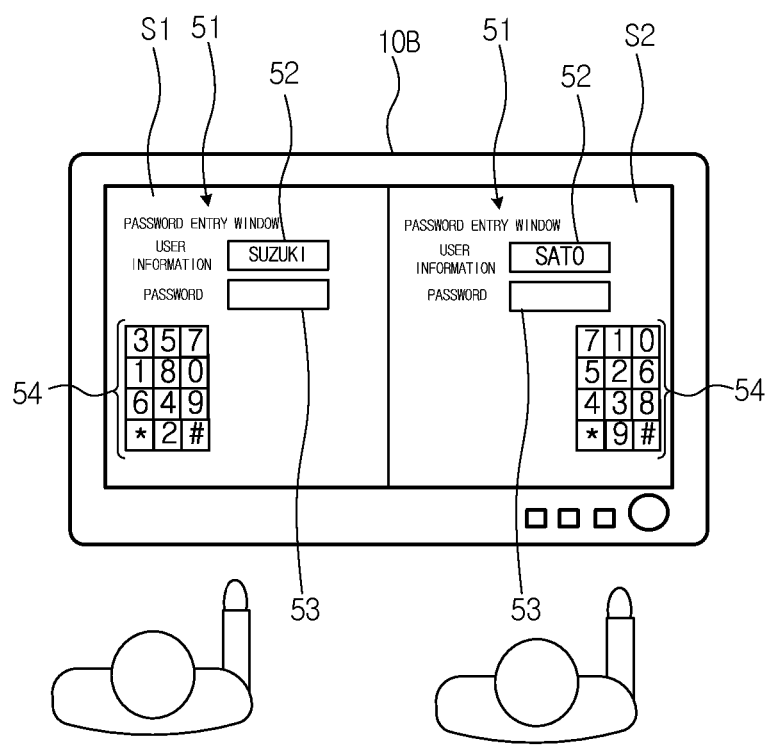

FIGS. 16A and 16B show the case in which a plurality of touch operations which are simultaneously detected are judged as separate single touch operations which are carried out by two operators. As shown in FIG. 16A, when the touch panel unit 17 simultaneously detects the first touch operation in which after the operator touches the display surface S on the initial point of the left arrow 43, the operator flicks the display surface S in the direction of the left arrow 43, and the second touch operation in which after the operator touches the display surface S on the initial point of the right arrow 44, the operator flicks the display surface S in the direction of the right arrow 44, the CPU 11 judges whether the operator who carries out the first touch operation and the operator who carries out the second touch operation are the same person by comparing the operator identification information obtained from the terminal device 110 of the operator who carries out the first touch operation by the human body communication via the finger relating to the first touch operation, with the operator identification information obtained from the terminal device 110 of the operator who carries out the second touch operation by the human body communication via the finger relating to the second touch operation.

In case that the CPU 11 judges that the operators who carry out the touch operations respectively are different persons, the CPU 11 recognizes that the first touch operation is a single touch operation carried out by the first operator and the second touch operation is a single touch operation carried out by the second operator. In this example, the CPU 11 recognizes that the first touch operation is the flick operation in the left direction, which is carried out by the first operator, and the second touch operation is the flick operation in the right direction, which is carried out by the second operator. As a result, as shown in FIG. 16B, the display surface S of the display unit 15 is divided into two areas S1 and S2 and separate windows are displayed in the areas S1 and S2, respectively to receive an operation independently in each of the separate windows. In this example, the display surface S is divided into the left area and the right area, and in each of the areas S1 and S2, the display contents (items) which are the same as the display contents displayed before dividing the display surface S, are displayed by changing the layout in the window.

The separate windows shown in FIG. 16B are the same as the password entry windows shown in FIG. 5B. In order to prevent the security information from being leaked by secretly viewing the information by the adjacent operator, the numerical keypad 54 displayed in the left area S1 after the division of the window and the numerical keypad 54 displayed in the right area S2 are arranged near the left end and the right end of the display surface S respectively, so as to be apart from each other. The key arrangements of the numerical keypads 54 in the password entry windows displayed in the areas S1 and S2 respectively, are different from each other.

Further, because the operation display device 10B according to the second embodiment obtains the operator identification information from the terminal device 110 by the human body communication, the operation display device 10B automatically sets the name or the like of the operator, which is specified from the obtained operator identification information, to the user information entry box 52.

In this example, the display surface S is divided into the right area and the lower area. Then, the left area S1 is assigned to the operator who carries out the first touch operation in which the display surface S is flicked in the direction of the left arrow 43, and the operator identification information (the operator's name: Suzuki) obtained from the terminal device 110 of the operator who carries out the first touch operation is set to the user information entry box 52 in the left area S1. Further, the right area S2 is assigned to the operator who carries out the second touch operation in which the display surface S is flicked in the direction of the right arrow 44, and the operator identification information (the operator's name: Sato) obtained from the terminal device 110 of the operator who carries out the second touch operation is set to the user information entry box 52 in the right area S2.

Also, in the operation display device 10B according to the second embodiment, like the first embodiment, the division direction in which the display surface S is divided is determined according to the dispersion status of the contact positions in a plurality of touch operations. In the operation display device 10B according to the second embodiment, the direction of the operator cannot be judged. Therefore, the direction of each separate window is the same as that of the window displayed before dividing the display surface S.

FIG. 17 shows the flowchart of the process carried out by the CPU 11 of the operation display device 10B when the operation display device 10B simultaneously detects a plurality of touch operations. The CPU 11 monitors whether the touch panel unit 17 detects the touch operation (contact) (Step S301). When the touch panel unit 17 detects a new touch operation (Step S301; Yes), the CPU 11 attempts to obtain the operator identification information by the human body communication via the finger with which the touch operation is carried out. In case that the operator identification information is obtained (Step S302; Yes), the CPU 11 registers the obtained operator identification information and the information indicating the contact position, which is obtained from the touch panel unit 17, in the management table 14a so as to relate them to each other (Step S303). Then, the process proceeds to Step S305.

In case that the operator identification information cannot be obtained by the human body communication (Step S302; No), the CPU 11 registers the operator identification information indicating the unspecified person (for example, the operator is registered as a visitor) and the information indicating the contact position, which is obtained from the touch panel unit 17, in the management table 14a so as to relate them to each other (Step S304). Then, the process proceeds to Step S305.

Next, the CPU 11 judges whether the touch operations to a plurality of portions are collectively detected on the display surface S (Step S305). In case that the touch operation is detected only on one portion (Step S305; No), the CPU 11 examines whether the touch operation is released (the finger is released from the display surface S) (Step S306). In case that the touch operation is released (Step S306; Yes), the CPU 11 judges that the touch operation is a single touch operation carried out by one operator (Step S307). The CPU 11 carries out the process corresponding to the single touch operation (process for changing the display contents and outputting the contents of the operation to the multi function peripheral or the like) (Step S308). Then, the process shown in FIG. 17 is ended.

In case that the touch operation is not released (Step S306; No), the CPU 11 examines whether a new touch operation is detected in Step S301. In case that the new touch operation is not received (Step S301; No), the CPU 11 examines whether the touch operation is released or not in Step S306 again.

In case that the touch operations to a plurality of portions are collectively detected (Step S305; Yes), the CPU 11 judges whether the touch operations to a plurality of portions are the multi-touch operation carried out by one operator from the information registered in the management table 14a (Step S309). In case that the operator identification information relating to all of the touch operations, which is stored in the management table 14a, indicates the same operator except the unspecified person, the CPU 11 judges that the touch operations are the multi-touch operation carried out by one operator. In case that the operator identification information relating to all of the touch operations, which is stored in the management table 14a does not indicate the same operator or the operator identification information relating to any of the touch operations indicates the unspecified person, the CPU 11 judges that the touch operations are operations carried out by a plurality of operators. For example, in case that the operator identification information relating to two touch operations is registered in the management table 14a, when the operator identification information indicates the operator A and the operator B, indicates the operator A and the unspecified person, or indicates the unspecified person in both of two touch operations, the CPU 11 judges that two touch operations are carried out by a plurality of operators respectively.

In case that the CPU 11 judges "one operator" (Step S310; Yes), the CPU 11 recognizes that a plurality of touch operations corresponding to a plurality of contact positions registered in the management table 14a are the multi-touch operation carried out by one operator (Step S311). The CPU 11 carries out the process corresponding to the multi-touch operation (the process for changing the display contents and outputting the contents of the operation to the multi function peripheral or the like) (Step S313). Then, the process shown in FIG. 17 is ended.

In case that the CPU 11 does not judge "one operator" (Step S310; No), the CPU 11 recognizes that a plurality of touch operations corresponding to a plurality of contact positions registered in the management table 14a are separate single touch operations carried out by a plurality of operators (Step S312). The CPU 11 carries out the process corresponding to the single touch operations (for example, the process for displaying the above-described separate windows) (Step S313). Then, the process shown in FIG. 17 is ended.

Figure 18:
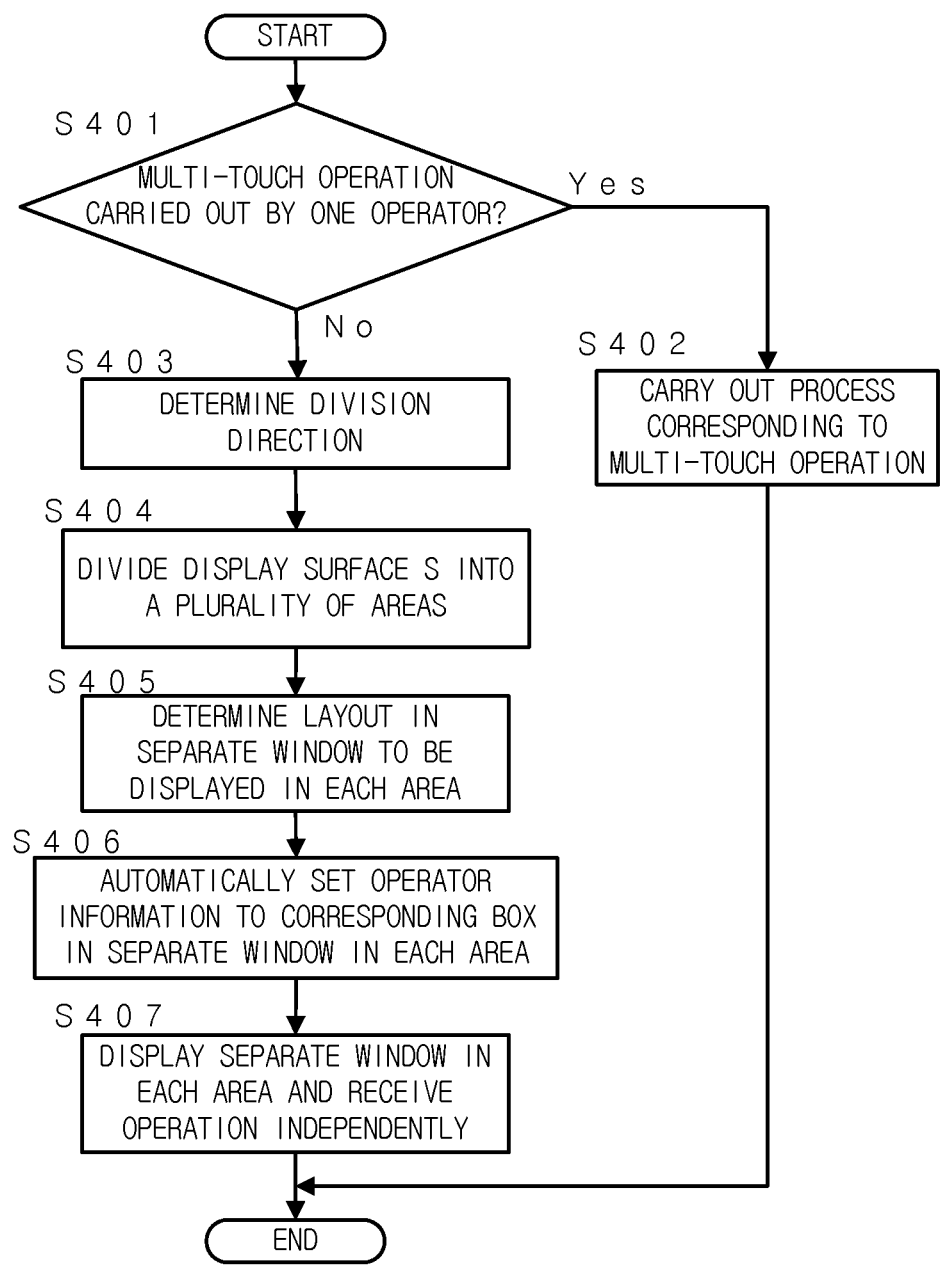
FIG. 18 is a flowchart showing the detail of the second multiple operation process (Step S313 in FIG. 17)

FIG. 18 shows the detail of the second multiple operation process (Step S313 in FIG. 17). In case that a plurality of touch operations are the multi-touch operation carried out by one operator (Step S401; Yes), the CPU 11 carries out the process corresponding to the multi-touch operation (the process for changing the display contents and outputting the contents of the operation to the multi function peripheral or the like) (Step S402). Then, the process is ended.

In case that a plurality of touch operation are not the multi-touch operation carried out by one operator (Step S401; No), the CPU 11 determines the division direction in accordance with the dispersion status of the contact positions (Step S403). Then, the display surface S is divided into the number of areas, which corresponds to the number of the operators, and in the division direction determined in Step S403 (Step S404).

Next, the layout in the separate window displayed in each area is determined (Step S405). As shown in FIGS. 5A and 5B, in order to prevent the information from being leaked by secretly viewing the information by another operator, the position of the operation buttons (numerical keypad 54 and the like) for entering the security information, the position of the password entry box 53 for the security information and the key arrangement of the numerical keypad 54 are determined. Further, the layout in the separate window, the size of each display object, the character size and the like are determined so as to match the size and the shape of the area.

Next, in case that the entry box in which the information is automatically set from the operator identification information, exists in the separate window to be displayed, the operator information specified from the operator identification information, such as the operator's name, is automatically set in the entry box (Step S406).

Then, the separate window is displayed in each area in accordance with the determined layout and the like. The operation display device 10B changes to the situation in which the operation can be received independently in each separate window (Step S407), and the process is ended.

As described above, in the operation display device 10B according to the second embodiment, each time the touch operation is received, the CPU 11 obtains the operator identification information from the terminal device held by the operator, by the human body communication via the operator's body including the finger with which the touch operation is carried out. Further, the CPU 11 registers the obtained operator identification information and the contact position on which the touch operation is received, so as to relate them to each other. Therefore, in case that a plurality of touch operations are simultaneously detected, it is possible to judge whether a plurality of touch operations are the multi-touch operation carried out by one operator, by comparing the operator identification information corresponding to each contact position.

Further, because the information is automatically entered in the entry box in which the information can be set from the operator identification information, it is possible to reduce the operation to be carried out by the operator. By automatically setting the operator identification information to the entry box, the operator can easily recognize the separate window to be operated among the separate windows.

Modified Example

Figure 19:
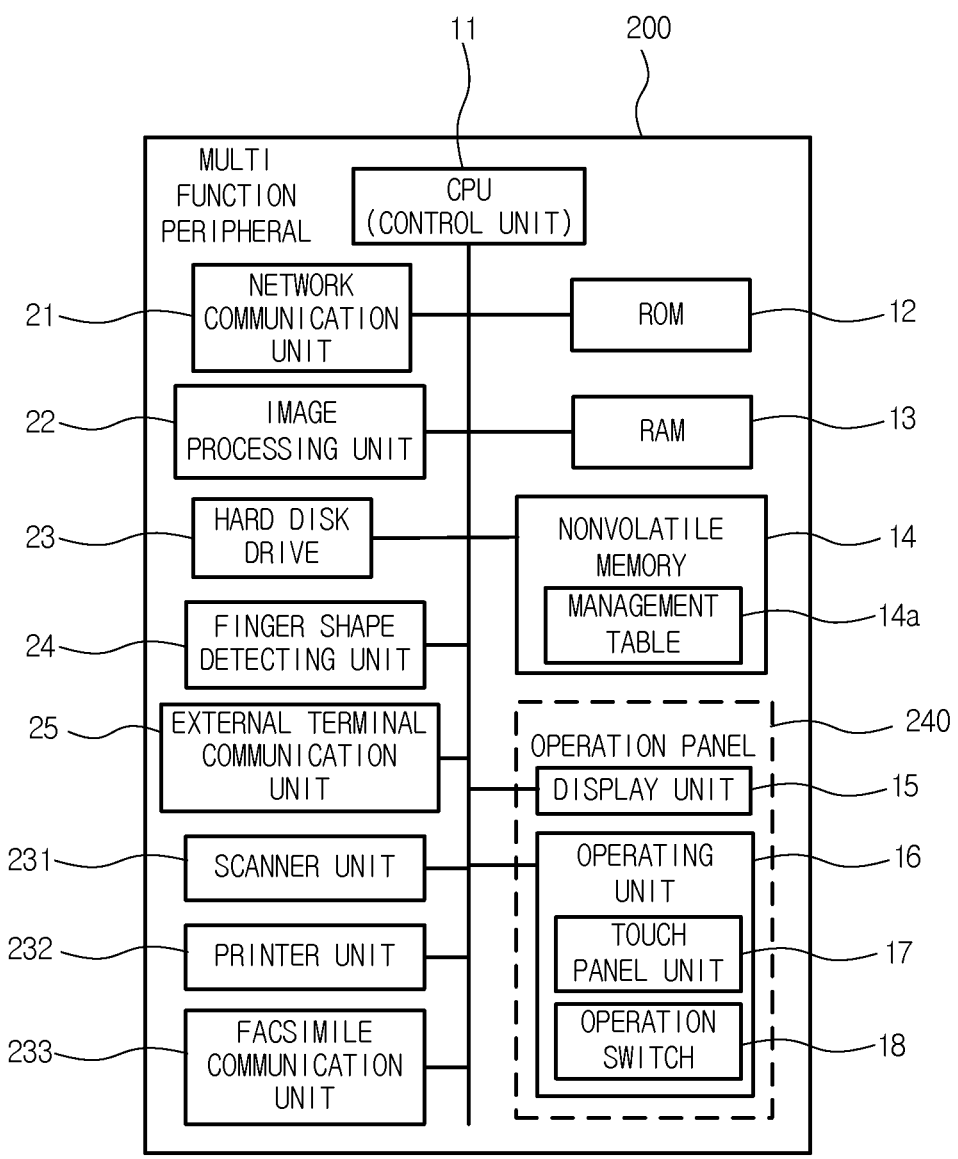
FIG. 19 is a block diagram showing an example of the configuration of the multi function peripheral including the function of the operation display device.

Each of the operation display device 10 and 10B according to the first and the second embodiments may be included in the main body of the device to be operated. FIG. 19 shows an example of the configuration of the multi function peripheral 200 including each of the functions of the operation display devices 10 and 10B. The multi function peripheral 200 shown in FIG. 19 is configured as the apparatus including both of the judgment function for judging the operator in accordance with the finger shape described in the first embodiment and the judgment function for judging the operator in accordance with the operator identification information obtained by the human body communication described in the second embodiment.

The multi function peripheral 200 is the apparatus having a copy function of printing an image on recording paper by optically reading an image of an original, a scan function of obtaining image data by reading an image of an original to store the image data as a file or to transmit the image data to an external terminal, a PC print function of printing out an image by forming an image relating to a print job received from an external terminal, such as a personal computer, on the recording paper, a facsimile function of transmitting and receiving the image data, and the like.

FIG. 19 is a block diagram showing a schematic configuration of the multi function peripheral 200. In the multi function peripheral 200, the elements which are the same as those of the operation display devices 10 and 10B according to the first and the second embodiments, are denoted by the reference numerals which are the same as those shown in the first and the second embodiments, respectively. The explanation of the same elements is arbitrarily omitted.

In the multi function peripheral 200, the CPU 11 for controlling the operation of the multi function peripheral 200 is connected with a ROM 12, a RAM 13, a nonvolatile memory 14, a display unit 15, an operating unit 16, a network communication unit 21, an image processing unit 22, a hard disk drive 23, a finger shape detecting unit 24, an external terminal communication unit 25 and the like via a bus. These elements are ones having the functions of the operation display devices 10 and 10B according to the first and the second embodiments.

Further, the multi function peripheral 200 comprises a scanner unit 231, a printer unit 232 and a facsimile communication unit 233 which are connected with the CPU 11 via the bus.

The scanner unit 231 obtains image data by optically reading an image of an original. For example, the scanner unit 231 comprises a light source for irradiating the original with light, a line image sensor for reading the original line by line in the width direction of the original by receiving the reflected light from the original, an optical system having lenses, mirrors and the like for guiding the reflected light from the original to the line image sensor and focusing the reflected light on the line image sensor, a moving mechanism for sequentially moving the reading position by moving the mirror and the light source line by line in the longitudinal direction of the original, and the like.

The printer unit 232 prints out an image by forming an image on recording paper in accordance with image data by the electrophotographic process. The printer unit 232 is configured as so-called laser printer comprising a conveying device for the recording paper, a photoconductive drum, a charging device, a LD (Laser Diode) which is switched on/off in accordance with the input image data, a scanning unit for scanning the photoconductive drum by the laser light emitted from the LD, a developing device, a transfer and separation device, a cleaning device and a fixing device. The printer unit 232 may be an LED printer in which the photoconductive drum is irradiated by using LEDs (Light Emitting Diode) instead of laser light, or another type of printer.

The facsimile communication unit 233 carries out the facsimile communication by carrying out the protocol control relating to the facsimile communication.

In the ROM 12, various types of programs and data are stored. By carrying out various types of processes by the CPU 11 in accordance with these programs, each function of the operation display devices 10 and 10B and each function of the multi function peripheral 200 are realized. The RAM 13 is used as an area for temporarily storing image data which is used by the multi function peripheral 200.

The hard disk drive 23 is used for storing image data of the original, which is obtained by reading an image of the original by the scanner unit 231, print data received from an external PC (Personal Computer) or the like, image data received via the facsimile communication, and the like.

The display unit 15 displays various types of operation windows and setting windows for operating the multi function peripheral 200. The operating unit 16 receives various types of operations for actuating the multi function peripheral 200, from the operator. The display unit 15 and the operating unit 16 constitute the operation panel 240 of the multi function peripheral 200.

The image processing unit 22 carries out the image processings, such as image correction, rotation, enlargement/reduction, compression/decompression and the like, for image data.

The multi function peripheral 200 has both of the judgment function for judging the operator in accordance with the finger shape and the judgment function for judging the operator in accordance with the operator identification information obtained by the human body communication. In the multi function peripheral 200 having both judgment functions, the operation display device operates as follows.

Each time the touch operation is received on the display surface S, the information relating to the shape of the finger with which the touch operation is carried out (finger attribute) and the contact position are registered in the management table 14a so as to relate them to each other. Further, in case that the operator identification information of the operator can be obtained by the human body communication, the obtained operator identification information is registered in the management table 14a so as to relate it to the contact position.

The process for the case in which a plurality of touch operations are simultaneously detected, is carried out as follows. In case that the operator identification information corresponding to a plurality of touch operations respectively can be obtained, the CPU 11 judges whether a plurality of touch operations are the multi-touch operation carried out by one operator in accordance with the operator identification information. In case that the operator identification information corresponding to some of a plurality of touch operations can be obtained, but the operator identification information corresponding to the others of touch operations cannot be obtained, the CPU 11 recognizes that the touch operations are carried out by a plurality of operators. In case that any operator identification information corresponding to the touch operations cannot be obtained, the CPU 11 judges whether a plurality of touch operations are the multi-touch operation carried out by one operator in accordance with the finger shapes.

Further, the CPU 11 judges the direction of each operator in accordance with the finger shape. Then, the CPU 11 sets the direction of the separate window displayed in each area, so as to match the direction of the operator to which the corresponding area is assigned. Further, in case that the operator identification information can be obtained, the information of the operator specified from the operator identification information is automatically set to the entry box.

As described above, in case that the multi function peripheral or the like has both of the judgment function for judging the operator in accordance with the finger shape and the judgment function for judging the operator in accordance with the operator identification information obtained by the human body communication, it is possible to accurately judge whether a plurality of touch operations which are simultaneously detected are the multi-touch operations carried out by one operator or the separate operations carried out by a plurality of operators, as compared with the multi function peripheral having only one judgment function.

Figure 20:
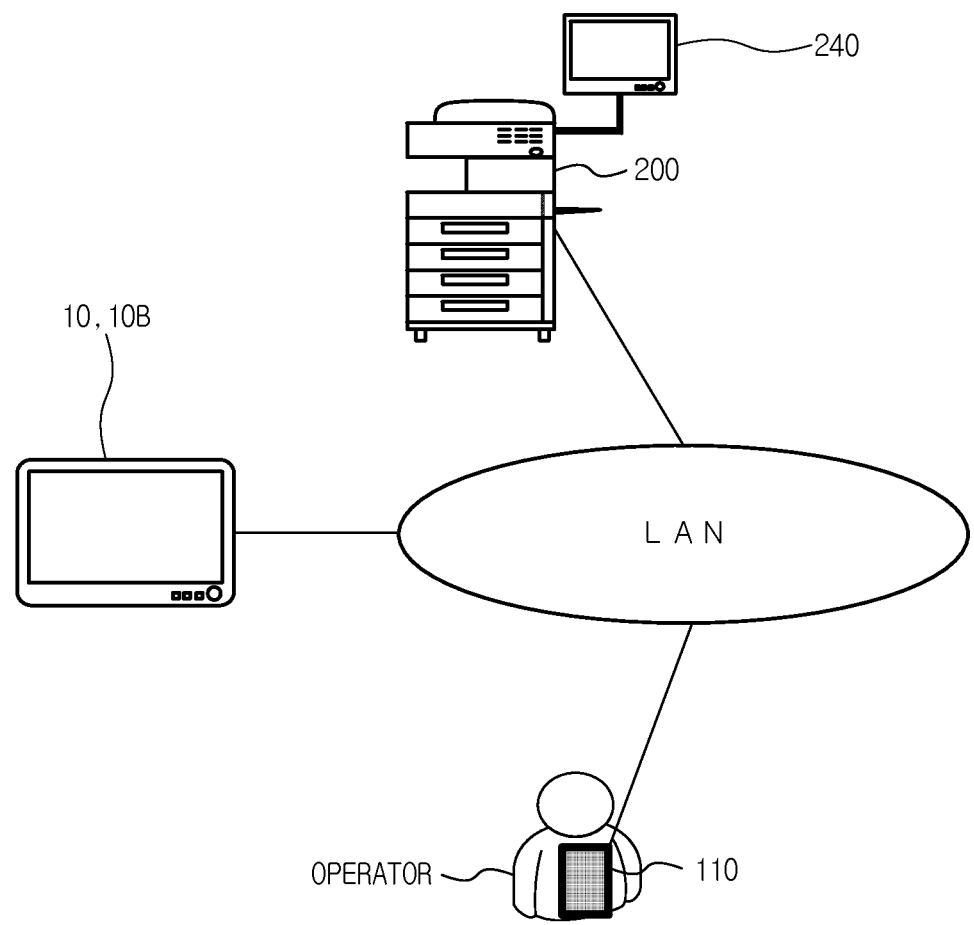
FIG. 20 is a view showing an example of the system configuration in which the multi function peripheral, the operation display device, the terminal device and the like are connected via a network so as to be communicable with each other.

FIG. 20 shows an example of the system configuration in which the multi function peripheral 200, the operation display device 10 or 10B, the terminal device 110 and the like are connected via a network so as to be communicable with each other. For example, the operation display device 10 or 10B is used for remotely operating the multi function peripheral 200. The operation display device 10 or 10B and the multi function peripheral 200 are connected with each other via the near field communication, such as Bluetooth® or the like.

As described above, the embodiments and the like are explained by using the drawings. However, in the present invention, the concrete configuration is not limited to the above embodiments and the like. In the present invention, various modifications of the above embodiments or the addition of various functions or the like to the embodiments can be carried out without departing from the gist of the invention.

In at least one of the embodiments and the like, when a plurality of touch operations which are simultaneously detected, are the operations carried out by a plurality of operators, the CPU 11 recognizes that a plurality of operations are separate single touch operations. However, in case that some touch operations carried out by one operator are included in a plurality of touch operations, the some touch operations may be treated as a set of touch operations carried out by one operator. For example, in case that three touch operations are simultaneously detected, when the operation display device judges that two of the three touch operations are touch operations carried out by the same operator and the other one is an operation carried out by another operator, the operation display device controls the display unit so as to set the number of the areas to "2".

In at least one of the embodiments and the like, as a process to be carried out when it is judged that a plurality of touch operations which are simultaneously detected are touch operations carried out by a plurality of operators, the display surface S is divided into a plurality of areas, separate windows are displayed on the areas respectively, and the operation is received independently in each separate window. However, another process may be carried out. For example, if a plurality of operations can be simultaneously received in one window, a plurality of processes corresponding to the received operations respectively, may be carried out.

One of the objects of the above embodiments and the like is to provide an operation display device, an operation display method and a tangible computer-readable recording medium which can accurately judge whether a plurality of touch operations to a plurality of portions, which are simultaneously detected, are the multi-touch operation carried out by one operator or are separate single touch operations carried out by a plurality of operators.

In at least one of the embodiments and the like, when a plurality of touch operations are simultaneously detected, the control unit judges whether a plurality of touch operations are the operation carried out by one operator or are the operations carried out by a plurality of operators in accordance with the shape of the finger relating to each operation, and changes the display contents in accordance with the above judgment result.

In at least one of the embodiments and the like, when the control unit judges that a plurality of touch operations are the operation carried out by one operator, a plurality of touch operations are treated as the multi-touch operation received from one operator. When the control unit judges that a plurality of touch operations are the operations carried out by a plurality of operators, the display surface is divided into a plurality of areas and the separate windows are displayed in the areas, respectively. Then, the operation is received independently in each of the separate windows.

In at least one of the embodiments and the like, the direction of the separate window displayed in each area after dividing the display surface, is set so as to match the direction of the operator to which the corresponding area is assigned. Preferably, the area including the touch operation is preferentially assigned to the operator who carries out the above touch operation.

In at least one of the embodiments and the like, for example, in case that a plurality of touch operations are dispersed in the right and left direction, the display surface is divided into the right area and the left area. In case that a plurality of touch operations are dispersed in the up and down direction, the display surface is divided into the upper area and the lower area.

In at least one of the embodiments and the like, the division pattern is selected so as to include the touch operations in each area one by one.

In at least one of the embodiments and the like, when a plurality of touch operations are simultaneously detected, the control unit judges whether a plurality of touch operations are the operation carried out by one operator or are the operations carried out by a plurality of operators in accordance with the operator identification information obtained by the human body communication via the fingers with which a plurality of touch operations are carried out.

In at least one of the embodiments and the like, when the control unit judges that a plurality of touch operations are the operation carried out by one operator, a plurality of touch operations are treated as the multi-touch operation received from one operator. When the control unit judges that a plurality of touch operations are the operations carried out by a plurality of operators, the display surface is divided into a plurality of areas and the separate windows are displayed in the areas, respectively. Then, the operation is received independently in each of the separate windows.

In at least one of the embodiments and the like, the operator information based on the operator identification information obtained by the human body communication unit, is automatically set to the corresponding entry box.

In at least one of the embodiments and the like, the separate windows having the display contents which are the same as those of the window displayed before dividing the display surface (the layout and the size of the separate window may be different from those of the window displayed before dividing the display surface.) are displayed in the areas, respectively after dividing the display surface.

In at least one of the embodiments and the like, by dissimilating the layouts in the separate windows from each other, even though an adjacent operator secretly views the window, it is difficult to guess the contents of the operation.

In at least one of the embodiments and the like, by dissimilating the key arrangements of the entry buttons in the separate windows from each other, even though an adjacent operator secretly views the window, it is difficult to guess the contents of the operation.

According to the operation display device, the operation display method and the tangible computer-readable recording medium, it is possible to accurately judge whether a plurality of touch operations to a plurality of portions, which are simultaneously detected, are the multi-touch operation carried out by one operator or are separate single touch operations carried out by a plurality of operators.

The present U.S. patent application claims the priority of Japanese Patent Application No. 2012-153711, filed on Jul. 9, 2012, according to the Paris Convention, and the entirety of which is incorporated herein by reference for correction of incorrect translation.

What is claimed is:

1. An operation display device, comprising:
a display unit;
a touch panel to simultaneously detect a plurality of touch operations including a plurality of operations which are each carried out with fingers sliding along a display surface of the display unit;
a finger shape detecting unit to detect a shape of a contact part of the finger, which contacts to the display surface in each of the touch operations; and
a processor to control display contents of the display unit and to execute the following operations:
when the plurality of operations carried out along the display surface are simultaneously detected by the touch panel, judging whether the plurality of operations are carried out by one operator or by a plurality of operators in accordance with the shape of the contact part of the finger relating to each operation, which is detected by the finger shape detecting unit,
determining whether the plurality of operations are a set of operations by one operator or are independent operations by each of the plurality of operators based on a result of the judging whether the plurality of operations are carried out by one operator or the plurality of operators, and
performing a predetermined process depending on the set of operations by one operator or the independent operations by each of the plurality of operators.

2. The operation display device of claim 1, wherein when the processor judges that the plurality of operations are carried out by one operator, the processor recognizes that the plurality of operations are a set of operations, and changes the display contents in accordance with contents of the set of operations, and
when the processor judges that the plurality of operations are carried out by the plurality of operators, the processor divides the display surface into a plurality of areas corresponding to the number of the operators, and instructs the display unit to display separate windows in the areas respectively, and the touch panel receives an operation independently in each of the separate windows.

3. The operation display device of claim 2, wherein when the processor judges that the plurality of operations are the operations carried out by the plurality of operators, the processor judges a direction of the operator corresponding to each finger in accordance with the shape of the contact part of each finger, which is detected by the finger shape detecting unit, assigns the areas to the plurality of operators respectively, and instructs the display unit to display the separate windows in the areas assigned to the plurality of operators respectively, so as to match each direction of the operators.

4. The operation display device of claim 2, wherein the processor changes a division direction in which the display surface is divided into the plurality of areas, in accordance with a dispersion status of contact positions of the fingers relating to the plurality of operations in the display surface.

5. The operation display device of claim 2, wherein the processor preferentially selects a division pattern in which the display surface is divided into the plurality of areas corresponding to the number of the operators, so as to include the operation carried out by each operator in each area, among a plurality of division patterns which are previously set, and divides the display surface in accordance with the selected division pattern.

6. The operation display device of claim 2, wherein the processor instructs the display unit to display the separate window in each area after dividing the display surface, so as to display contents in each separate window, which are same as contents displayed in the window before dividing the display surface.

7. The operation display device of claim 6, wherein in case that the separate window having an entry button for entering security information is displayed in each area after dividing the display surface, the processor determines respective layouts in the separate windows so as to dissimilate the layouts from each other.

8. The operation display device of claim 6, wherein in case that the separate window having a plurality of entry buttons for entering security information is displayed in each area after dividing the display surface, the processor determines respective arrangements of the entry buttons in the separate windows so as to dissimilate the arrangements from each other.

9. The operation display device of claim 1, wherein the processor changes the display contents of the display unit depending on which type of the plurality of operations is determined by the processor.

10. The operation display device of claim 1, wherein the processor determines that the different types of the plurality of operations are a pinch-in operation, a pinch-out operation and a rotation operation, performed by one operator when the processor judges that the plurality of operations are the operation carried out by one operator.

11. An operation display device, comprising:
a display unit;
a touch panel to simultaneously detect a plurality of touch operations including a plurality of operations which are each carried out with fingers sliding along a display surface of the display unit;
a human body communication unit to obtain operator identification information for uniquely specifying an operator who contacts to the display surface with a finger, from a terminal device by communicating with the terminal device via a body of the operator; and a processor to control display contents of the display unit and to execute the following operations:

when the plurality of operations carried out along the display surface are simultaneously detected by the touch panel, judging whether the plurality of operations are carried out by one operator or by a plurality of operators in accordance with the operator identification information obtained by the human body communication unit via the fingers with which the operations are carried out, determining whether the plurality of operations are a set of operations by one operator or are independent operations by each of the plurality of operators based on a result of the judging whether the plurality of operations are carried out by one operator or the plurality of operators, and performing a predetermined process depending on the set of operations by one operator or the independent operations by each of the plurality of operators.

12. The operation display device of claim 11, wherein when the processor judges that the plurality of operations are carried out by one operator, the processor recognizes that the plurality of operations are a set of operations, and changes the display contents in accordance with contents of the set of operations, and when the processor judges that the plurality of operations are carried out by the plurality of operators, the processor divides the display surface into a plurality of areas corresponding to the number of the operators, and instructs the display unit to display separate windows in the areas respectively, and the touch panel receives an operation independently in each of the separate windows.

13. The operation display device of claim 12, wherein in case that there is an entry box for entering operator information in the separate window displayed in each area, the processor automatically sets the operator information to the entry box in accordance with the operator identification information obtained by the human body communication unit.

14. The operation display device of claim 12, wherein the processor instructs the display unit to display the separate window in each area after dividing the window displayed by the display unit, so as to display contents in each separate window, which are same as contents displayed in the window before dividing the display surface.

15. The operation display device of claim 14, wherein in case that the separate window having an entry button for entering security information is displayed in each area after dividing the display surface, the processor determines respective layouts in the separate windows so as to dissimilate the layouts from each other.

16. The operation display device of claim 14, wherein in case that the separate window having a plurality of entry buttons for entering security information is displayed in each area after dividing the display surface, the processor determines respective arrangements of the entry buttons in the separate windows so as to dissimilate the arrangements from each other.

17. The operation display device of claim 11, wherein the processor changes the display contents of the display unit depending on which type of the plurality of operations is determined by the processor.

18. The operation display device of claim 11, wherein the processor determines that the different types of the plurality of operations are a pinch-in operation, a pinch-out operation and a rotation operation, performed by one operator when the processor judges that the plurality of operations are the operation carried out by one operator.

19. A non-transitory computer-readable recording medium storing a program, wherein the program causes an information processing device comprising a display unit; a touch panel to simultaneously detect a plurality of touch operations including a plurality of operations which are each carried out with fingers sliding along a display surface of the display unit; and a finger shape detecting unit to detect a shape of a contact part of the finger, which contacts to the display surface in each of the touch operations, to execute:

judging whether the plurality of operations are carried out by one operator or by a plurality of operators in accordance with the shape of the contact part of the finger relating to each operation, which is detected by the finger shape detecting unit, when the plurality of operations carried out along the display surface are simultaneously detected by the touch panel;

determining whether the plurality of operations are a set of operations by one operator or are independent operations by each of the plurality of operators based on a result of the judging whether the plurality of operations are carried out by one operator or the plurality of operators; and performing a predetermined process depending on the set of operations by one operator or the independent operations by each of the plurality of operators.

20. The non-transitory computer-readable recording medium of claim 19, wherein when the information processing device judges that the plurality of operations are carried out by one operator, the program causes the information processing device to recognize that the plurality of operations are a set of operations, and change the display contents in accordance with contents of the set of operations, and when the information processing device judges that the plurality of operations are carried out by the plurality of operators, the program causes the information processing device to divide the display surface into a plurality of areas corresponding to the number of the operators, instruct the display unit to display separate windows in the areas respectively, and receive an operation independently in each of the separate windows.

21. The non-transitory computer-readable recording medium of claim 19, wherein the program causes an information processing device to change the display contents of the display unit depending on which type of the plurality of operations is determined.

22. The non-transitory computer-readable recording medium of claim 19, wherein the program causes an information processing device to determine that the different types of the plurality of operations are a pinch-in operation, a pinch-out operation and a rotation operation, performed by one operator when the processor judges that the plurality of operations are the operation carried out by one operator.

23. A non-transitory computer-readable recording medium storing a program, wherein the program causes an information processing device comprising a display unit; a touch panel to simultaneously detect a plurality of touch operations including a plurality of operations which are each carried out with fingers sliding along a display surface of the display unit; and a human body communication unit to obtain operator identification information for uniquely specifying an operator who contacts to the display surface with a finger, from a terminal device by communicating with the terminal device via a body of the operator, to execute:

judging whether the plurality of operations are carried out by one operator or by a plurality of operators in accordance with the operator identification information obtained by the human body communication unit via the fingers with which the operations are carried out, when the plurality of operations carried out along the display surface are simultaneously detected by the touch panel;

determining whether the plurality of operations are a set of operations by one operator or are independent operations by each of the plurality of operators based on a result of the judging whether the plurality of operations are carried out by one operator or the plurality of operators; and performing a predetermined process depending on the set of operations by one operator or the independent operations by each of the plurality of operators.

24. The non-transitory computer-readable recording medium of claim 23, wherein when the information processing device judges that the plurality of operations are carried out by one operator, the program causes the information processing device to recognize that the plurality of operations are a set of operations, and change the display contents in accordance with contents of the set of operations, and when the information processing device judges that the plurality of operations are carried out by the plurality of operators, the program causes the information processing device to divide the display surface into a plurality of areas corresponding to the number of the operators, instruct the display unit to display separate windows in the areas respectively, and receive an operation independently in each of the separate windows.

25. The non-transitory computer-readable recording medium of claim 23, wherein the program causes an information processing device to change the display contents of the display unit depending on which type of the plurality of operations is determined.

26. The non-transitory computer-readable recording medium of claim 23, wherein the program causes an information processing device to determine that the different types of the plurality of operations are a pinch-in operation, a pinch-out operation and a rotation operation, performed by one operator when the processor judges that the plurality of operations are the operation carried out by one operator.

27. An operation display method for controlling an information processing device comprising a display unit; a touch panel to simultaneously detect a plurality of touch operations including a plurality of operations which are each carried out with fingers sliding along a display surface of the display unit; and a human body communication unit to obtain operator identification information for uniquely specifying an operator who contacts to the display surface with a finger, from a terminal device by communicating with the terminal device via a body of the operator, the method comprising:

judging whether the plurality of operations are carried out by one operator or by a plurality of operators in accordance with the operator identification information obtained by the human body communication unit via the fingers with which the operations are carried out, when the plurality of operations carried out along the display surface are simultaneously detected by the touch panel;

determining whether the plurality of operations are a set of operations by one operator or are independent operations by each of the plurality of operators based on a result of the judging whether the plurality of operations are carried out by one operator or the plurality of operators; and performing a predetermined process depending on the set of operations by one operator or the independent operations by each of the plurality of operators.

28. The operation display method of claim 27, wherein when it is judged that the plurality of operations are carried out by one operator, it is recognized that the plurality of operations are a set of operations, and the display contents are changed in accordance with contents of the set of operations, and when it is judged that the plurality of operations are carried out by the plurality of operators, the display surface is divided into a plurality of areas corresponding to the number of the operators, the display unit is instructed to display separate windows in the areas respectively, and an operation is received independently in each of the separate windows.

29. The operation display method of claim 27, comprising changing the display contents of the display unit depending on which type of the plurality of operations is determined.

30. The operation display method of claim 27, comprising determining that the different types of the plurality of operations are a pinch-in operation, a pinch-out operation and a rotation operation, performed by one operator when the processor judges that the plurality of operations are the operation carried out by one operator.

31. An operation display method for controlling an information processing device comprising a display unit; a touch panel to simultaneously detect a plurality of touch operations including a plurality of operations which are each carried out with fingers sliding along a display surface of the display unit; and a finger shape detecting unit to detect a shape of a contact part of the finger, which contacts to the display surface in each of the touch operations, the method comprising:

judging whether the plurality of operations are carried out by one operator or by a plurality of operators in accordance with the shape of the contact part of the finger relating to each operation, which is detected by the finger shape detecting unit, when the plurality of operations carried out along the display surface are simultaneously detected by the touch panel;

determining whether the plurality of operations are a set of operations by one operator or are independent operations by each of the plurality of operators based on a result of the judging whether the plurality of operations are carried out by one operator or the plurality of operators; and performing a predetermined process depending on the set of operations by one operator or the independent operations by each of the plurality of operators.

32. The operation display method of claim 31, wherein when it is judged that the plurality of operations are carried out by one operator, it is recognized that the plurality of operations are a set of operations, and the display contents are changed in accordance with contents of the set of operations, and when it is judged that the plurality of operations are carried out by the plurality of operators, the display surface is divided into a plurality of areas corresponding to the number of the operators, the display unit is instructed to display separate windows in the areas respectively, and an operation is received independently in each of the separate windows.

33. The operation display method of claim 31, comprising changing the display contents of the display unit depending on which type of the plurality of operations is determined.

34. The operation display method of claim 31, comprising determining that the different types of the plurality of operations are a pinch-in operation, a pinch-out operation and a rotation operation, performed by one operator when the processor judges that the plurality of operations are the operation carried out by one operator.

* * * * *